(12) United States Patent
Mallya et al.

(10) Patent No.: US 10,654,604 B2
(45) Date of Patent: May 19, 2020

(54) RE-CLOSURE TAPE APPLICATION ON PACKAGING MACHINE

(71) Applicant: FLEX R&D, INC., Beverly Hills, CA (US)

(72) Inventors: Prakash Mallya, Sierra Madre, CA (US); Ramin Heydarpour, Beverly Hills, CA (US); David Nicholas Edwards, Santa Fe, NM (US); William Ben Bower, Palo Alto, CA (US)

(73) Assignee: FLEX R&D INC., Beverly Hills, CA (US)

( * ) Notice: Subject to any disclaimer, the term of this patent is extended or adjusted under 35 U.S.C. 154(b) by 0 days.

(21) Appl. No.: 16/155,886

(22) Filed: Oct. 9, 2018

(65) Prior Publication Data

US 2019/0039764 A1 Feb. 7, 2019

Related U.S. Application Data

(63) Continuation-in-part of application No. 15/680,900, filed on Aug. 18, 2017, now Pat. No. 10,196,544.
(Continued)

(51) Int. Cl.
*B65B 51/06* (2006.01)
*C09J 7/38* (2018.01)
(Continued)

(52) U.S. Cl.
CPC .......... *B65B 51/06* (2013.01); *B32B 37/1292* (2013.01); *B65B 9/06* (2013.01);
(Continued)

(58) Field of Classification Search
CPC ...... B23K 26/082; B23K 26/26; B23K 26/60; C09J 2201/128; C09J 2201/134;
(Continued)

(56) References Cited

U.S. PATENT DOCUMENTS 3,314,838 A 4/1967 Erwin
3,331,279 A 7/1967 Erik et al.
(Continued)

FOREIGN PATENT DOCUMENTS

EP 1 214 384 A1 6/2002
EP 2 424 948 A2 3/2012
WO WO 2009/137588 11/2009

OTHER PUBLICATIONS

International Search Report in International application No. PCT/US2018/024527.
(Continued)

*Primary Examiner* — Sonya M Sengupta
(74) *Attorney, Agent, or Firm* — Rajendra G. Sardesai

(57) ABSTRACT

A tape closure system is shown and described herein. The tape closure system includes a first tape component having a pressure sensitive adhesive and a second tape component having a pressure sensitive adhesive, where at least one of the pressure sensitive adhesives has a modified surface to reduce the tack of the surface such that when the first and second pressure adhesives are brought into contact with one another they may sufficiently adhere to one another to form a seal but are still separable from one another and able to be repeatedly opened and sealed. Such a tape may be manufactured through high speed manufacturing processes and wound into large master rolls. In the roll configuration, the modified surface contacts the backside of the liner and experiences compressive forces in the roll. Due to the compressive forces, a part of the modified surface may get pushed into the PSA, thereby affecting the properties of the modified adhesive. An embodiment of this invention provides an embossed liner with spacers that nest the modified adhesive surface when it is self-wound, thereby preventing the deterioration of the adhesive properties. An embodiment of the invention is a method by which the adhesive-based (Continued)

closure system can be applied on to a flexible packaging material on a Form Fill Seal packaging machine in one of three ways: (1) In a form of a tape from a spool. (2) In a form of an adhesive dispensed directly on to flexible packaging material. (3) In form of a tape dispensed from a roll of pressure sensitive adhesive roll. Another embodiment of the invention is a double sided tape with the detack layer on both sides. An embodiment of the present invention can also be used for temporary closure with no damage done to the underlying system.

17 Claims, 31 Drawing Sheets

Related U.S. Application Data

(60) Provisional application No. 62/741,071, filed on Oct. 4, 2018, provisional application No. 62/584,358, filed on Nov. 10, 2017, provisional application No. 62/571,506, filed on Oct. 12, 2017, provisional application No. 62/570,266, filed on Oct. 10, 2017, provisional application No. 62/478,312, filed on Mar. 29, 2017.

(51) Int. Cl.
| | | |
|---|---|---|
| B65B 9/06 | (2012.01) | |
| B32B 37/12 | (2006.01) | |
| B65B 7/28 | (2006.01) | |
| B65B 61/02 | (2006.01) | |
| C08K 7/02 | (2006.01) | |

(52) U.S. Cl.
CPC .............. *C09J 7/38* (2018.01); *B65B 7/2864* (2013.01); *B65B 61/025* (2013.01); *C08K 7/02* (2013.01); *C09J 2201/128* (2013.01); *C09J 2201/134* (2013.01); *C09J 2201/28* (2013.01); *C09J 2201/32* (2013.01); *C09J 2201/36* (2013.01); *C09J 2201/606* (2013.01); *C09J 2205/10* (2013.01); *C09J 2205/102* (2013.01)

(58) Field of Classification Search
CPC ......................... C09J 2201/28; C09J 2201/32; C09J 2201/36; C09J 2201/606; C09J 2205/10; C09J 2205/102; C09J 7/38; B65B 51/06; B65B 61/025; B65B 7/2864; B65B 9/06; C08K 7/02; B32B 37/1292
USPC .................................................. 156/66, 291
See application file for complete search history.

(56) References Cited

U.S. PATENT DOCUMENTS

| | | | |
|---|---|---|---|
| 4,376,151 A | 3/1983 | Parrotta | |
| 4,556,595 A | 12/1985 | Ochi | |
| 4,876,842 A | 10/1989 | Ausnit | |
| 4,894,975 A | 1/1990 | Ausnit | |
| 4,937,040 A | 6/1990 | Holcomb et al. | |
| 5,141,790 A | 8/1992 | Calhoun et al. | |
| 5,346,766 A | 9/1994 | Otter et al. | |
| 5,551,208 A | 9/1996 | Van Erden | |
| 5,557,907 A | 9/1996 | Malin et al. | |
| 5,564,259 A | 10/1996 | Stolmeier | |
| 5,638,586 A | 6/1997 | Malin et al. | |
| 5,871,607 A * | 2/1999 | Hamilton .............. | B65D 65/14 156/221 |
| 6,047,521 A | 4/2000 | Terminella et al. | |
| 6,076,969 A | 6/2000 | Jaisle et al. | |
| 6,159,596 A | 12/2000 | Calhoun et al. | |
| 6,393,673 B1 | 5/2002 | Kourtidis et al. | |
| 6,541,098 B2 | 4/2003 | Venkatasanthanam | |
| 6,751,932 B1 | 6/2004 | Matthews | |
| 7,316,052 B2 | 1/2008 | Pawloski et al. | |
| 7,340,807 B2 | 3/2008 | Dais et al. | |
| 7,516,596 B2 | 4/2009 | Henderson et al. | |
| 7,736,058 B2 | 6/2010 | Tanaka et al. | |
| 7,857,515 B2 | 12/2010 | Dais et al. | |
| 8,875,356 B2 | 11/2014 | Zerfas et al. | |
| 10,196,544 B2 * | 2/2019 | Mallya ..................... | B32B 7/00 |
| 2011/0171430 A1 | 7/2011 | Mayers et al. | |
| 2014/0069061 A1 | 3/2014 | Anzini | |
| 2018/0282584 A1 * | 10/2018 | Mallya ..................... | B32B 7/00 |

OTHER PUBLICATIONS

Written Opinion of the International Searching Authority in International application No. PCT/US 2018/024527.
Vertical Form Fill Seal, Machine Profile, ABB motion control products, www.abb.com/motion, 2018.
Vertical Form Fill and Seal, Application Technique, Allen-Bradley, Rockwell Automation, http://ab.rockwellautomation.com/Motion-Control, 2018.
Guide to Vertical Form-Fill-Seal Baggers, Bosch, www.boschpackaging.com, 2018.
End Seal Technology Development Project Presentation, Automatic Test and Control Limited, 2008.
Line Equipment manual, www.lineequipment.co.uk, 2018.
Zip-Pak Global Innovations Summary, 2013, www.zippak.com.
The Wiley Encylopedia of Packaging Technology, 3rd Edition, Edited by Kit L Yam, Wiley, Sep. 2009, pp. 340-346.
Reliability of Evaluation Choice of System Solutions . . . Order-Picking Systems for Bagged Goods, Thorsten Schmidt, Logistics Journal Referierte Veroffentlichungen, May 2005.
U.S. Appl. No. 15/680,900, filed Aug. 18, 2017.
U.S. Appl. No. 16/156,584, filed Oct. 10, 2018.
U.S. Appl. No. 16/205,223, filed Nov. 30, 2018.
Automation of VFFS Machine, Allen-Bradley, Rockwell Automation, 2015.
Radpak machines, www.radpak.net/machines.html, Jan. 2, 2019.

* cited by examiner

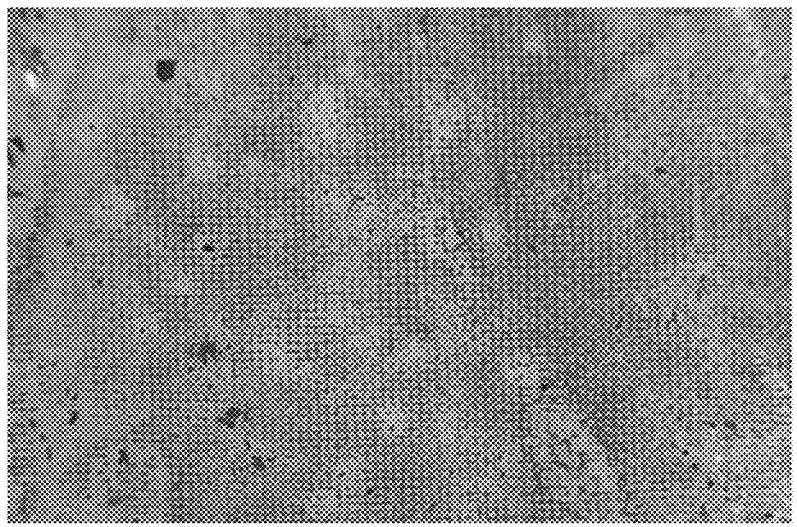
FIGURE 8: Example 1.2.1
FIGURE 9: Example 1.1.9

FIGURE 10: Example 1.2.2
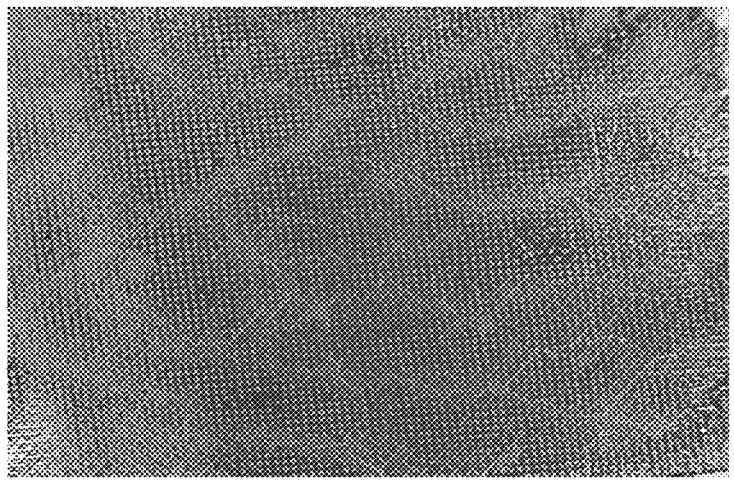
FIGURE 11: Example 1.2.3

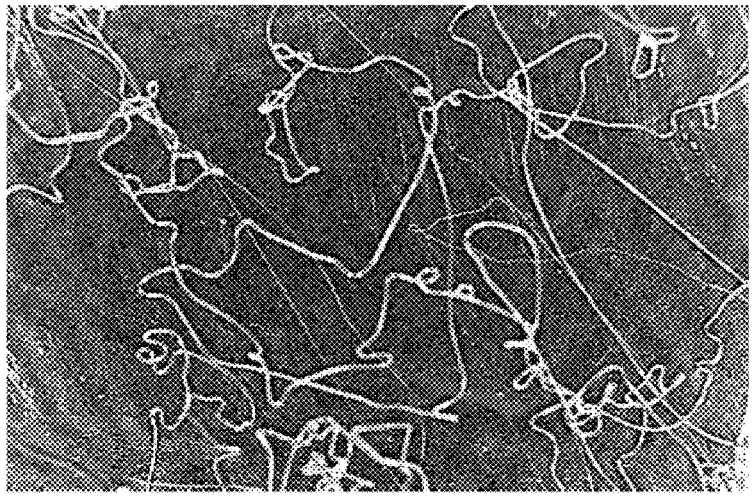
FIGURE 12: Example 2.1
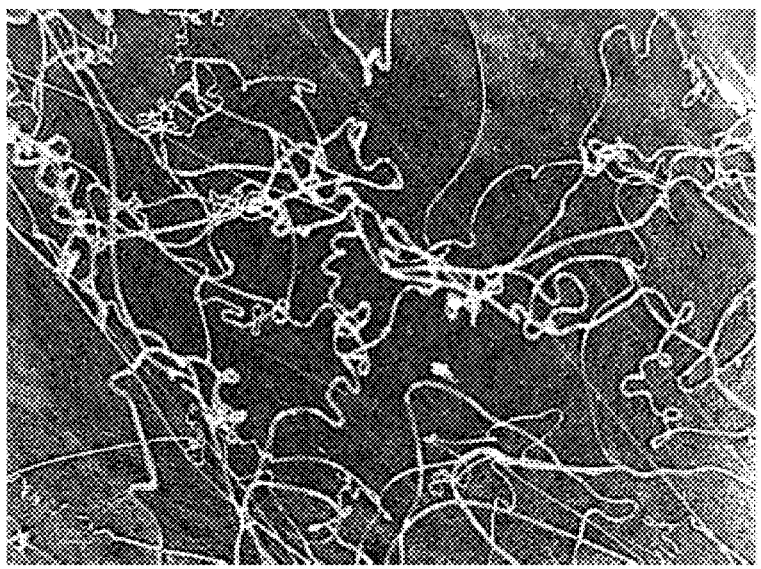
FIGURE 13: Example 2.1.1

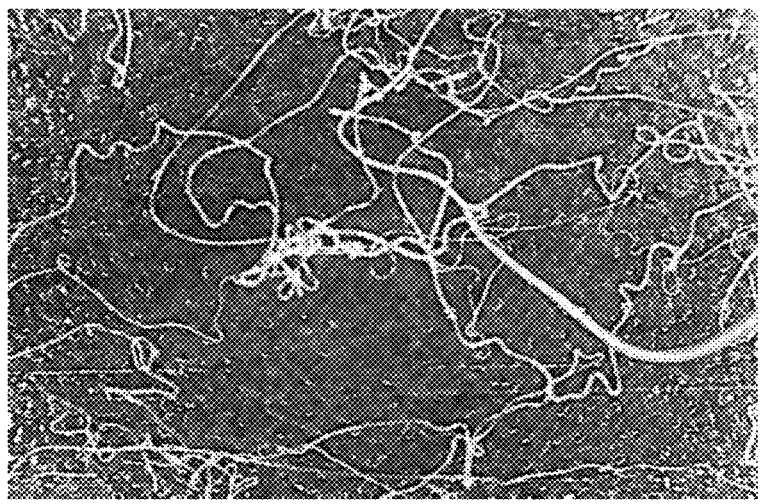
FIGURE 14: Example 2.1.2
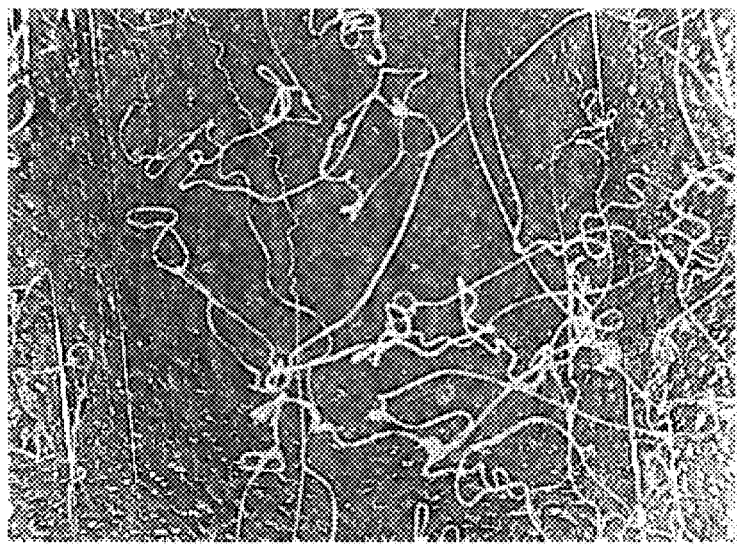
FIGURE 15: Example 2.1.3
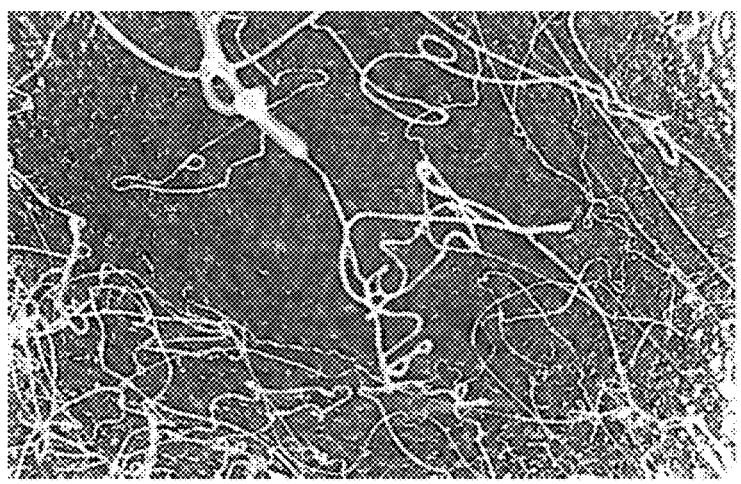
FIGURE 16: Example 2.1.4

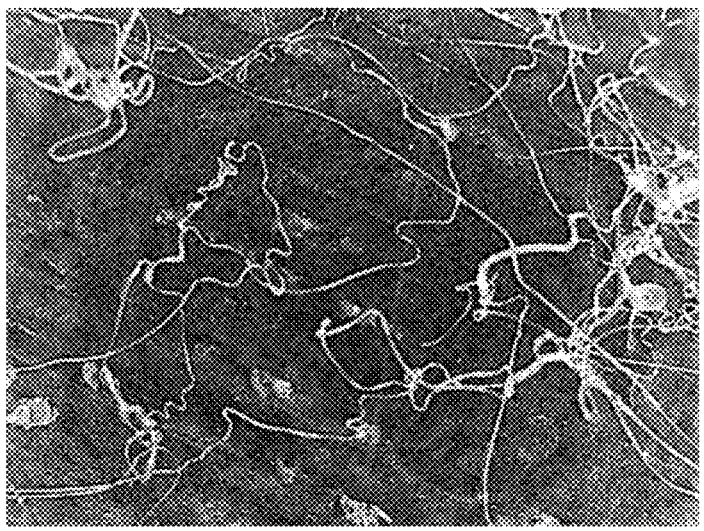
FIGURE 17: Example 2.2.2
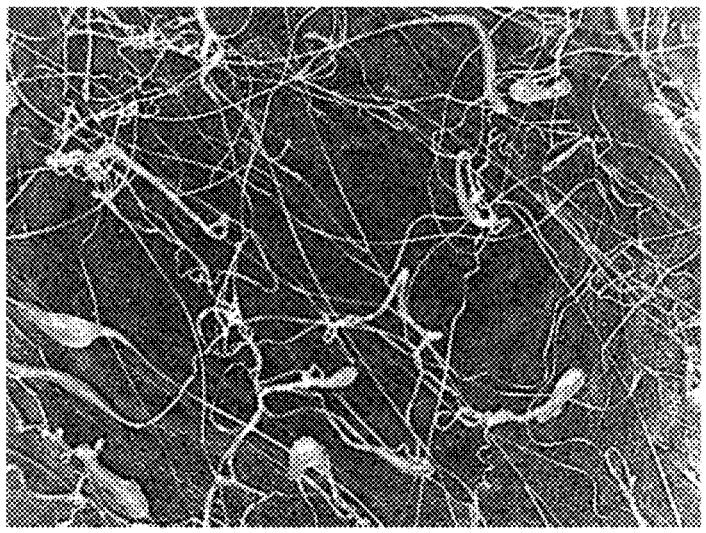
FIGURE 18: Example 2.2.3
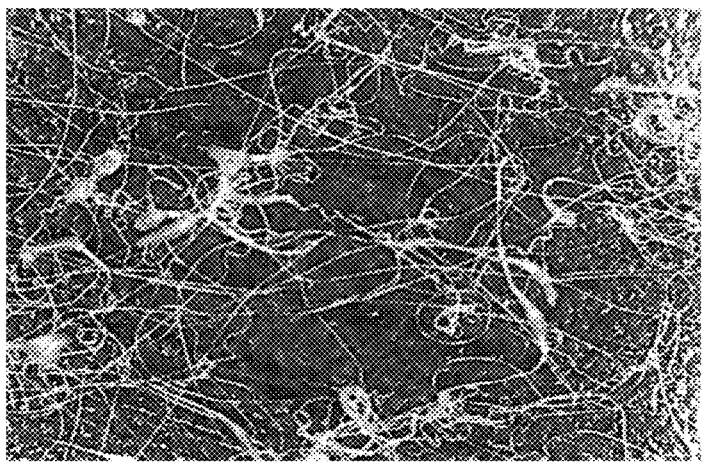
FIGURE 19: Example 2.2.4

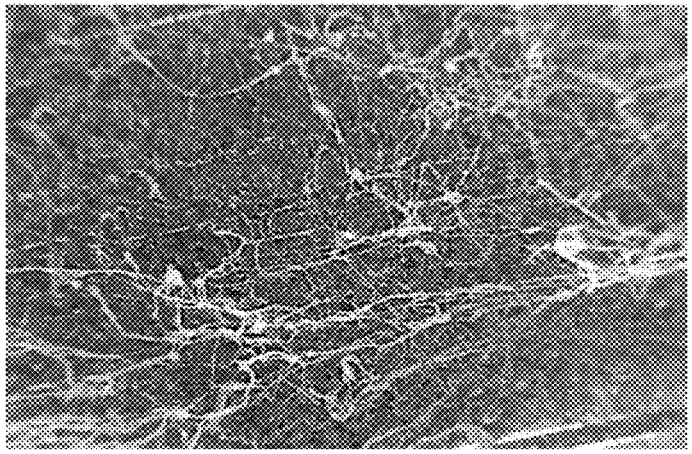
FIGURE 20: Example 2.3.1
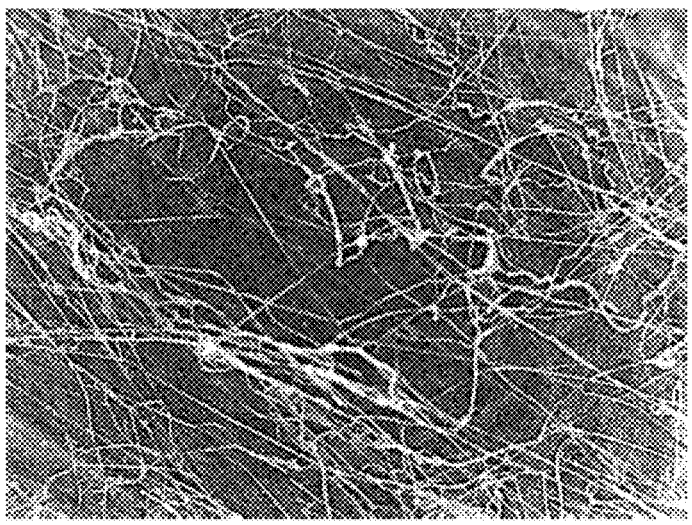
FIGURE 21: Example 2.3.2
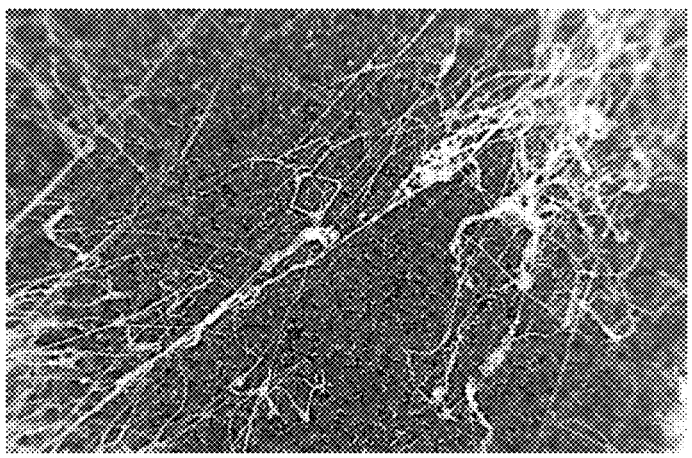
FIGURE 22: Example 2.3

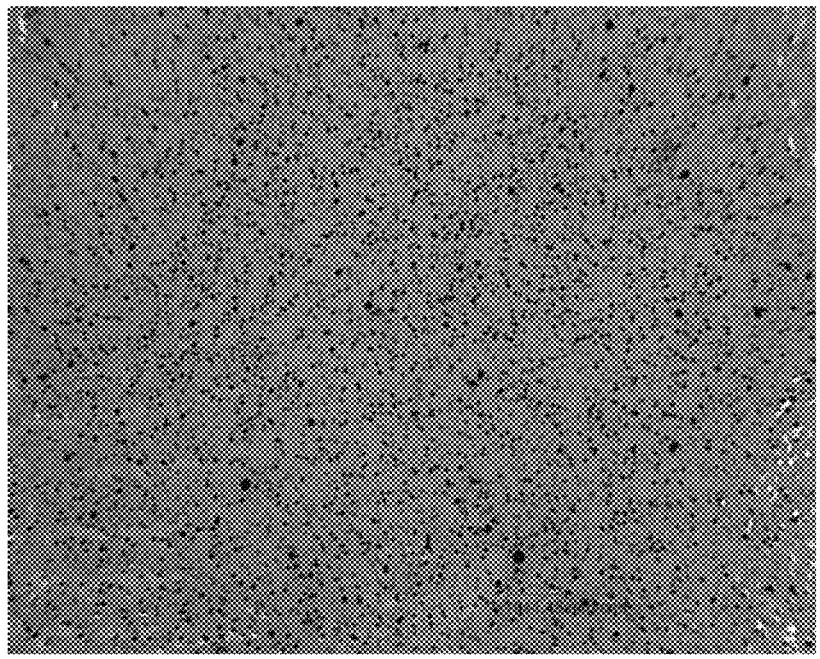
FIGURE 23: Example 5.1.1
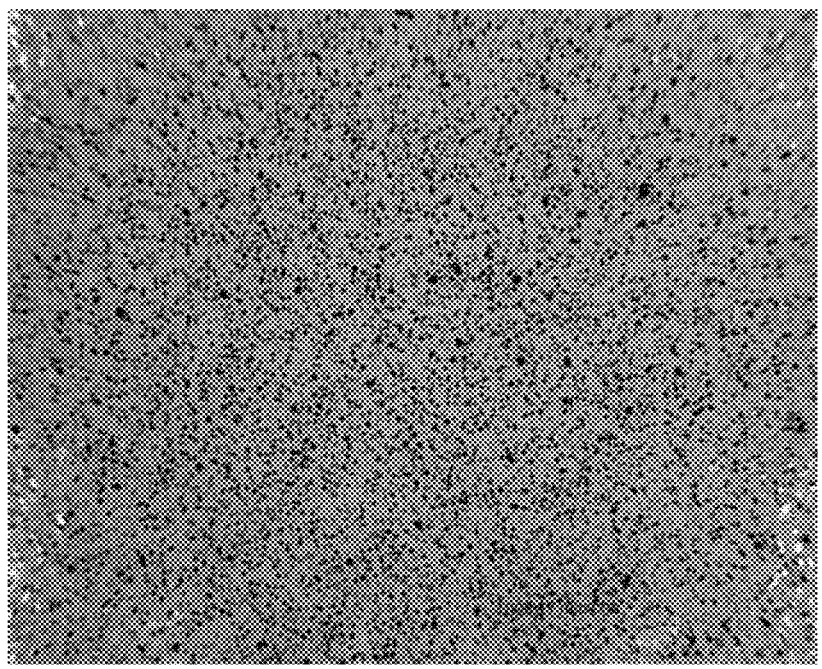
FIGURE 24: Example 5.1.2

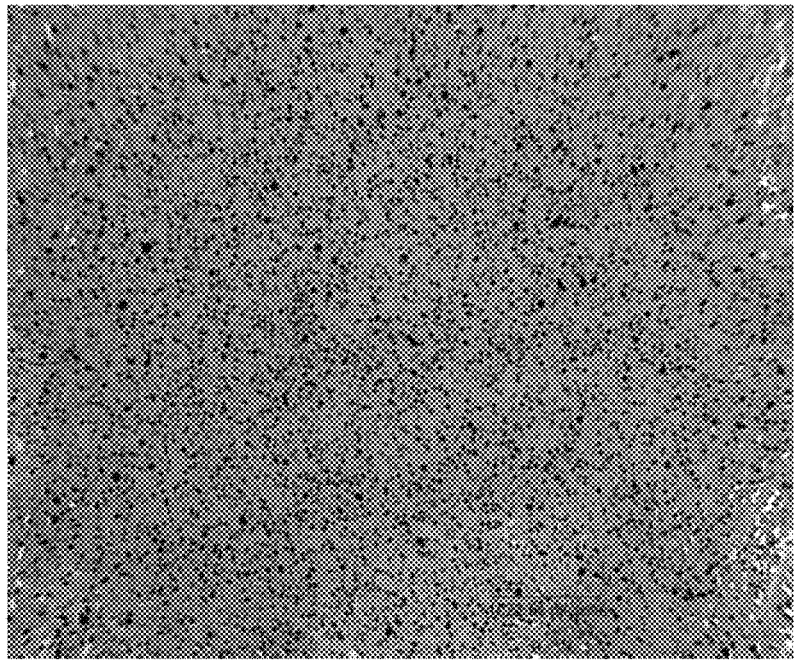
FIGURE 25: Example 5.2.1
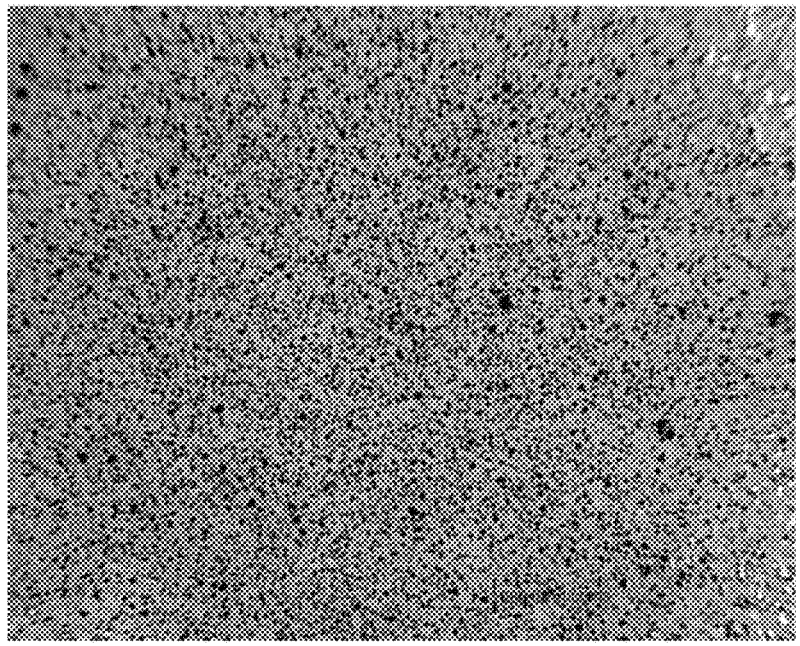
FIGURE 26: Example 5.2.3

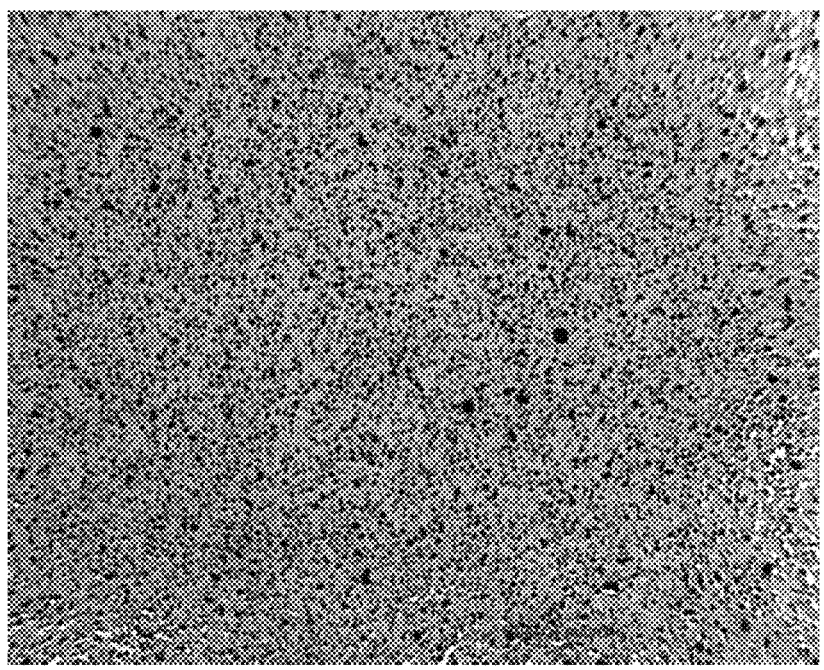
FIGURE 27: Example 5.3.3

| Continuous Signature Nozzles | Intermittent Signature Nozzles | Control Coat Nozzles |
|---|---|---|
| 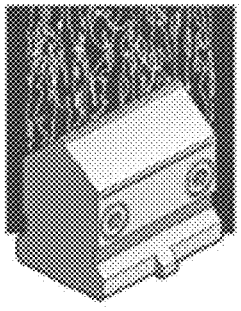 | 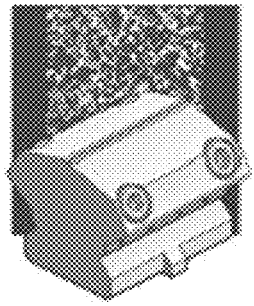 | 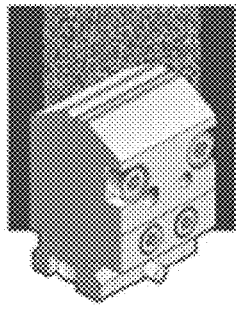 |
| Random Fibers | Intermittent | Uniform |
FIGURE 33

Tape strips with length equal to roll width
Tape strips length less than roll width
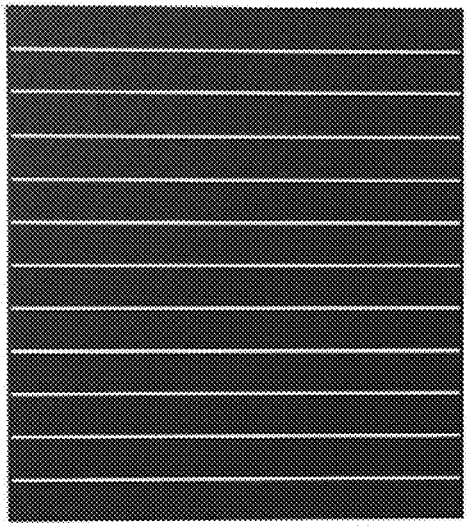
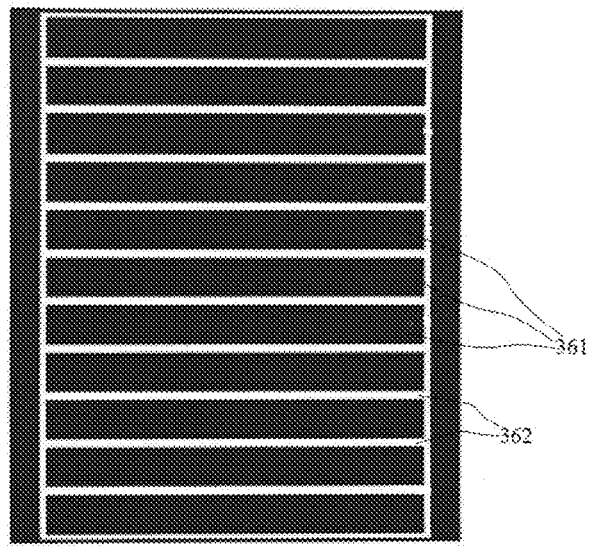
Each strip is supported on liner and carried to deflection point for attachment to packaging material
FIGURE 36

RE-CLOSURE TAPE APPLICATION ON PACKAGING MACHINE

CROSS-REFERENCE TO RELATED APPLICATIONS

The present application claims priority to and the benefit of U.S. Provisional Application 62/741,071 filed on Oct. 4, 2018 and U.S. patent application Ser. No. 15/680,900 filed Aug. 18, 2017, which claims priority to and the benefit of U.S. Provisional Application 62/478,312 filed on Mar. 29, 2017, the entire disclosures of the above-listed applications are incorporated herein by reference in their entirety.

FIELD OF INVENTION

The present invention relates to a two-part adhesive-based closure system which allows both ease of closure without careful alignment of the components and the ability to open and reclose many times. The system includes a pressure sensitive adhesive surface having a modified surface topography to provide a surface having a relatively low tack or non-tacky surface. The pressure sensitive adhesive of at least one adhesive is provided with a surface having a low or non-tacky surface such that when it is brought together with another adhesive surface (e.g., of a second tape) it can adhere to and form a seal with the other adhesive surface, but such that the adhesive surfaces may be easily separated from one another. Such a system provides a resealable closure system for a variety of packages. Further the design limits fouling of the sealing area by contaminants which may contact said area. Such a tape may be manufactured through high speed manufacturing processes and wound into large master rolls. In the roll configuration, the modified surface contacts the backside of the liner and experiences compressive forces in the roll. Due to the compressive forces, a part of the modified surface may get pushed into the PSA, thereby affecting the properties of the modified adhesive. An embodiment of this invention provides an embossed liner with spacers that nest the modified adhesive surface when it is self-wound, thereby preventing the deterioration of the adhesive properties. Another embodiment of the invention is a method by which the adhesive-based closure system can be applied on to a flexible packaging material on a Form Fill Seal packaging machine in at least one of three ways: (1) In a form of a tape from a spool. (2) In a form of an adhesive dispensed directly on to flexible packaging material. (3) In form of a tape dispensed from a roll of pressure sensitive adhesive roll. The invention also describes a double-sided tape with the detack layer on both sides. Another embodiment of the present invention can also be used for temporary closure with no damage done to the underlying system.

BACKGROUND

Closure systems for packaging, e.g., food packaging, may be categorized into three general categories: (i) cohesives, (ii) pressure sensitive adhesive based closures, and (iii) mechanical closures. A cohesive is a class of material that has no tack or adhesion except to itself an example of a cohesive system is illustrated in U.S. Pat. No. 6,076,969. These materials are often used to attach and form secure closures in food packaging such as, for example, in candy bars. These closures are essentially "one use" closure systems that are not suitable for repeatedly opening and closing the package.

Many packages are provided with a closure system to allow for repeated opening and resealing of the package to protect the contents inside the package. Pressure sensitive adhesive-based closures and mechanical closures may be employed for such applications. Pressure sensitive adhesive systems have been provided as detackified adhesives where the intrinsic properties of the adhesive are manipulated to reduce the tack and peel adhesion (see, e.g., U.S. Pat. No. 5,346,766). For example, the modulus of the adhesive may be adjusted to reduce the initial tack and peel adhesion. In these types of adhesives, adhesion builds over time as the adhesive flows and recovers its intrinsic properties.

Pressure sensitive based closures are based on simple PSA tapes attached to one of the side package adhering to the substrate on the other side. In some of those cases, an adhesive is modified with an additive such as a cluster of particles, powders or talc on the surface to alter the initial tack and peel properties of the adhesive. There are cases of PSA systems wherein the surface is modified with glass particles such as in U.S. Pat. No. 5,141,790. Although such tapes or laminates are not used in food closure and packaging applications, in these systems, pressure is used to press in on the additive, e.g., the glass particles, to embed them into the adhesive bulk and the adhesion builds rapidly. A number of patents such as U.S. Pat. Nos. 4,376,151, 4,556,595, 3,331,279, and 3,314,838 all fall within this category to limit the initial adhesion and then activate the adhesion to a substrate by pressing down with pressure. These kinds of PSA laminates are used for industrial graphics applications such as the decoration of sides of trucks, etc. where the slidability of these large graphics on substrates is needed. A number of other patents, such as U.S. Pat. Nos. 6,541,098 and 5,871,607, deal with modification of the surface of a highly conformable film or substrate with a topology of upraised non-tacky regions and valleys with adhesive. These structures provide the non-tacky feel to the finger as it slides along the upraised non-tacky regions. On applying pressure, the finger then contacts the adhesives in the valleys building adhesion. These have been used for applications such as Glad Press n Seal.

In the afore mentioned adhesives, the adhesives are applied to one surface of the package and are suitable for adhering to another surface of the package that is free of any adhesive.

Mechanical systems include such items as Velcro, "zipper" systems, hook and loop, slider systems, "mushroom" type closures, and various male/female closure systems, etc., and are commonly used on packages to allow for opening and resealing or closing the package. Examples of such systems are illustrated in U.S. Pat. No. 7,857,515 (hook and loop), U.S. Pat. No. 7,736,058 (mushroom type), U.S. Pat. Nos. 7,316,052, 7,340,807, and U.S. Patent Publication No. 2011/0171430 (male/female closure systems). Such systems require careful alignment of the components to close the package correctly. Additionally, such systems are three-dimensional in character and add to the surface profile of the package. Mechanical systems are also typically expensive and difficult to manufacture and apply for certain types of packages.

SUMMARY

The following presents a summary of this disclosure to provide a basic understanding of some aspects. This summary is intended to neither identify key or critical elements nor define any limitations of embodiments or claims. Furthermore, this summary may provide a simplified overview of some aspects that may be described in greater detail in other portions of this disclosure.

In accordance with one aspect, provided is an adhesive closure system having a reduced tack to allow for sealing and unsealing a package numerous times. The adhesive closure system includes a first adhesive surface and a second adhesive surface configured to engage the first adhesive surface. At least one of the adhesive surfaces is provided such that it has a reduced tack. In some embodiments, both the first adhesive surface and the second adhesive surface are modified to have a reduced tack. The first and second adhesives are configured to mate with one another, where the reduced tack adhesive surface(s) allow for adequate sealing but still permit relatively easy separation of the surfaces.

In one aspect, provided is a tape-based closure system comprising a first tape having a first pressure sensitive adhesive surface and a second tape having a second pressure sensitive adhesive surface, wherein at least one of the first or second pressure sensitive adhesive surfaces is modified with an additive such that the pressure sensitive adhesive surface has a reduced tack.

This closure system is a low-cost alternate to zippers, sliders, Velcro, and other such closure systems for items that require repeated and easy closing and opening without careful alignment. Such an adhesive tape system is achieved through modifying the topology of one or both of the pressure-sensitive adhesive surfaces through a non-tacky additive such as ink, filler, or other polymeric or non-polymeric material which protrudes from one or both surfaces of the adhesive. The additive modifies the surface to make it low or non-tacky to touch and slideable to the finger. The modifiers can also prevent contamination of the adhesive such as by preventing adhesion of foreign substances, such as food stuffs or contents of a package, to the adhesive surface. Such contamination could limit or minimize the adhesion of the adhesive surfaces to one another, which might reduce the number of times the closure system can be opened and resealed. The additive may be randomly or uniformly distributed on one or both surfaces of the adhesive. When the two surfaces are brought together and pressed, the tacky parts in the valleys of one surface contact the hills or the smooth part on the adjacent surface forming a bond. The bond strength may be controlled by various factors including, for example, adhesive coat weight, amount of additive on the surfaces, the surface coverage of the additive, the height, size and modulus of the additive, contact area between the two surfaces, force applied to close, and the time of contact. The bond strength may be tailored to be low enough to open easily but high enough to form a good and generally continuous seal.

In one aspect, provided is an adhesive closure system comprising: a first pressure sensitive adhesive having an upper adhesive surface; and a second pressure sensitive adhesive having an upper adhesive surface, wherein the adhesive surfaces of the first and second pressure sensitive adhesives can be repeatedly attached and detached to one another to form a closure, and the adhesive surface of (i) the first pressure sensitive adhesive, (ii) the second pressure sensitive adhesive, or (iii) both the first pressure sensitive adhesive and the second pressure sensitive adhesive comprise a plurality of standoffs defining a modified surface topography.

In one or more embodiments, the adhesive closure system may include any of the following features separately or in combination with one another:

Each of the first pressure sensitive adhesive and the second pressure sensitive adhesive has a modified surface topography.

The standoffs (or projections or protrusions) are provided by a filler admixed with the pressure sensitive adhesive.

The standoffs are provided by a material applied to the surface of the pressure sensitive adhesive.

The standoffs are formed from an ink, an elastomeric material, or a polymeric material or an inorganic material.

The standoffs are formed from a hot melt elastomer, an emulsion elastomer, or a combination thereof.

The standoffs are provided as discrete, regular shapes.

The standoffs are provided in a regular pattern.

The standoffs are provided in a random arrangement.

The standoffs are provided as elongated lines, fibrils, or filaments.

The standoffs in the shape of elongated lines, fibrils, or filaments are disposed in a random array.

The standoffs are provided by elongated lines, fibrils, or filaments of different lengths and/or thicknesses disposed in a random array.

At least two of the plurality of standoffs on a given adhesive partially overlap with one another.

The standoffs cover from about 5% to about 60% of the surface area of the adhesive surface; from about 10% to about 50%; from about 15% to about 45%; or from about 20% to about 30% of the total surface area of the pressure sensitive adhesive surface.

The system has a T Peel value of from about 0.2 N/inch to about 20 N/inch; from about 0.5 N/inch to about 10 N/inch; from about 1 about 5 N/inch; or from about 2 to about 4 N/inch.

The system has a T Peel value of at least 0.5 N/inch or higher after 10 reclosures.

The system has a T Peel value of 0.5 N/inch to 15 N/inch; from 1 N/inch to 10 N/inch, or from 2 N/inch to 4 N/inch after 10 reclosures.

The height of the standoff is from about 2 μm to about 500 μm; from about 10 μm to about 300 μm; from about 25 μm to about 250 μm; from about 50 μm to about 150 μm; even from about 30 μm to about 100 μm.

The standoffs may have a diameter or thickness of from about 5 μm to about 500 μm; from about 10 μm to about 250 μm; from about 25 μm to about 150 μm; even from about 30 μm to about 100 μm.

The coat weight of the standoffs is in the range of from about 2 grams/m$^2$ (gsm) to about 40 gsm; from about 5 gsm to about 30 gsm; even from about 2 to about 25 gsm.

The first pressure sensitive adhesive and the second pressure sensitive adhesive are provided as a tape.

In one aspect, provided is a package having a first surface and a second surface adapted to be releasably joined together, the article comprising an adhesive closure system according to any of the previous embodiments.

In one aspect, provided is a tape comprising a facestock or carrier film, a first adhesive disposed on a lower surface of the facestock or carrier film, and a second adhesive disposed on the upper surface of the facestock or carrier film, the second adhesive being a pressure sensitive adhesive having a plurality of standoffs defining a modified surface topography. In one embodiment, the tape is disposed on a liner such that the first adhesive is adjacent to the liner. The liner is a film or paper which is coated on one or both sides with a silicone or other release material from which the adhesives can be easily removed. The tape may be provided as a roll in wound form by winding the tape onto itself so the second adhesive contacts a surface of the liner during storage. The tape may be provided such that:

- The standoffs are provided by a filler admixed with the pressure sensitive adhesive.
- The standoffs are provided by a material applied to the surface of the pressure sensitive adhesive.
- The standoffs are formed from an ink, an elastomeric material, a polymeric material or an inorganic material.
- The standoffs are formed from a hot melt elastomer, an emulsion elastomer, an inorganic material or a combination thereof.
- The standoffs are provided as discrete, regular shapes.
- The standoffs are provided in a regular pattern.
- The standoffs are provided in a random arrangement.
- The standoffs are provided as elongated lines or continuous or discontinuous filaments.
- The standoffs in the shape of elongated lines are disposed in a random array.
- The standoffs are provided by elongated lines, fibrils, or filaments of different lengths and/or thicknesses disposed in a random array.
- At least two of the plurality of standoffs on a given adhesive partially overlap with one another.
- The standoffs cover from about 5% to about 60% of the surface area of the adhesive surface; from about 10% to about 50%; from about 15% to about 45%; even from about 20% to about 40% of the total surface area of the pressure sensitive adhesive surface.
- The system has a T Peel value of from about 0.2 N/inch to about 20 N/inch; from about 0.5 N/inch to about 10 N/inch; from about 1 N/inch to about 5 N/inch; even from about 2 N/inch to about 4 N/inch.
- The system has a T Peel value of at least 0.5 N/inch or higher after 10 reclosures.
- The system has a T Peel value of 0.5 N/inch to 15 N/inch; from 1 N/inch to 10 N/inch, or from 2 N/inch to 4 N/inch after 10 reclosures.
- The height of the standoff is from about 2 μm to about 500 μm; from about 10 μm to about 300 μm; from about 25 μm to about 250 μm; from about 50 μm to about 150 μm; even from about 75 μm to about 100 μm.
- The standoffs may have a diameter or thickness of from about 5 μm to about 500 μm; from about 10 μm to about 250 μm; from about 25 μm to about 150 μm; even from about 50 μm to about 100 μm.
- The coat weight of the standoffs is in the range of from about 2 gsm to about 40 gsm; from about 5 gsm to about 30 gsm; even from about 10 to about 25 gsm; or about 2 to about 25 gsm.

In one embodiment of the invention, a liner is provided which is embossable at least on one side whereby the embossed side of the liner comes in contact with the modified adhesive surface. By providing these recesses of about 5 to 95 microns, the standoffs are nested in these recesses and the standoff configuration is not altered by the compressive pressures that are otherwise experienced by the entire adhesive surface in the roll form. Embossing of such a liner provides recesses and spacers, and these spacers end up as the load bearers while the recesses act as the nests to prevent the deformation of the modified adhesive surface. Spacers are raised portions that provide a recess between the spacers to nest the standoffs, e.g., filaments deposited on the top surface of the PSA layer. In one embodiment, spacers are formed by embossing of the liner. In another embodiment, the spacers are formed by extrusion during the manufacture of the film followed by release coating to form the liner. In yet another embodiment, the spacers are formed by printing, spraying or dusting material on the film or paper followed by release coating to form the liner.

An embodiment of the invention is a method by which the adhesive-based closure system can be applied on to a flexible packaging material on a Form Fill Seal packaging machine in at least one of three ways: (1) In a form of a tape from a spool. (2) In a form of an adhesive dispensed directly on to flexible packaging material. (3) In form of a tape dispensed from a roll of pressure sensitive adhesive roll. In the first case (adhesive tape on the spool), the adhesive based closure system is removed from the release liner on a peeling plate and is subsequently applied to the flexible packaging material prior to the forming collar in the transverse direction. In the second case (direct adhesive dispensing), the adhesive and detack layers are directly dispensed on to the flexible packaging material using an adhesive/polymer dispensing unit. In the third case (adhesive tape from roll of adhesive tape material), the tape is either pre-cut to shape on the roll or, it is cut in situ on the roll material and is subsequently dispensed in transverse direction on to the flexible packaging material. Another embodiment of the invention is a double sided tape with the detack layer on both sides. An embodiment of the present invention can also be used for temporary closure with no damage done to the underlying system.

BRIEF DESCRIPTION OF THE DRAWINGS

The accompanying drawings illustrate various systems, apparatuses, devices and related methods, in which like reference characters refer to like parts throughout, and in which:

FIG. 2b is a cross-sectional view of the tape closure system of FIG. 2a;

FIG. 8 is a micrograph of a surface of a modified pressure sensitive adhesive of Example 1;

FIG. 9 is a micrograph of a surface of a modified pressure sensitive adhesive of Example 1;

FIG. 10 is a micrograph of a surface of a modified pressure sensitive adhesive of Example 1;

FIG. 11 is a micrograph of a surface of a modified pressure sensitive adhesive of Example 1;

FIG. 12 is a micrograph of a surface of a modified pressure sensitive adhesive of Example 2;

FIG. 13 is a micrograph of a surface of a modified pressure sensitive adhesive of Example 2:

FIG. 14 is a micrograph of a surface of a modified pressure sensitive adhesive of Example 2;

FIG. 15 is a micrograph of a surface of a modified pressure sensitive adhesive of Example 2;

FIG. 16 is a micrograph of a surface of a modified pressure sensitive adhesive of Example 2;

FIG. 17 is a micrograph of a surface of a modified pressure sensitive adhesive of Example 2;

FIG. 18 is a micrograph of a surface of a modified pressure sensitive adhesive of Example 2;

FIG. 19 is a micrograph of a surface of a modified pressure sensitive adhesive of Example 2;

FIG. 20 is a micrograph of a surface of a modified pressure sensitive adhesive of Example 2:

FIG. 21 is a micrograph of a surface of a modified pressure sensitive adhesive of Example 2;

FIG. 22 is a micrograph of a surface of a modified pressure sensitive adhesive of Example 2;

FIG. 23 is a micrograph of a surface of a modified pressure sensitive adhesive of Ex. 5.1.1 of Table 5;

FIG. 24 is a micrograph of a surface of a modified pressure sensitive adhesive of Ex. 5.1.2 of Table 5;

FIG. 25 is a micrograph of a surface of a modified pressure sensitive adhesive of Ex. 5.2.1 of Table 5;

FIG. 26 is a micrograph of a surface of a modified pressure sensitive adhesive of Ex. 5.2.3 of Table 5;

FIG. 27 is a micrograph of a surface of a modified pressure sensitive adhesive of Ex. 5.3.3 of Table 5;

FIG. 33 shows spray patterns produced by continuous signature, intermittent signature and control coat nozzles of Nordson Corporation;

FIG. 36 shows two die-cut geometries of the reclosure tape on a release liner;

The following description and the drawings disclose various illustrative aspects. Some improvements and novel aspects may be expressly identified, while others may be apparent from the description and drawings.

DETAILED DESCRIPTION

Reference will now be made to exemplary embodiments, examples of which are illustrated in the accompanying drawings. It is to be understood that other embodiments may be utilized and structural and functional changes may be made. Moreover, features of the various embodiments may be combined or altered. As such, the following description is presented by way of illustration only and should not limit in any way the various alternatives and modifications that may be made to the illustrated embodiments. In this disclosure, numerous specific details provide a thorough understanding of the subject disclosure. It should be understood that aspects of this disclosure may be practiced with other embodiments not necessarily including all aspects described herein, etc.

As used herein, the words "example" and "exemplary" means an instance, or illustration. The words "example" or "exemplary" do not indicate a key or preferred aspect or embodiment. The word "or" is intended to be inclusive rather than exclusive, unless context suggests otherwise. As an example, the phrase "A employs B or C," includes any inclusive permutation (e.g., A employs B; A employs C; or A employs both B and C). As another matter, the articles "a" and "an" are generally intended to mean "one or more" unless context suggest otherwise.

Provided is an adhesive closure system. In embodiments, the closure system is a two-part tape-based closure system comprising a first tape having a first pressure sensitive adhesive surface and a second tape having a second pressure sensitive adhesive surface, wherein the first pressure sensitive adhesive and/or the second pressure sensitive adhesive is modified to provide a surface having a reduced tack. The modified pressure sensitive adhesive surface is modified such that the surface has a relatively low tack or is non-tacky. The modified pressure sensitive adhesive surface has a tack such that an object, e.g., a finger, contents of a container, etc., can move over the modified pressure sensitive adhesive without sticking. The closure system with the modified pressure adhesive surface(s) allows for the pressure sensitive adhesive surfaces to be brought together and adhered to one another (to form a seal or closure), but the modified surface(s) allows for the surfaces to be separated from or pulled apart from one another. The sealing and unsealing may be repeated numerous times to operate as a resealable closure system.

Figure 1:
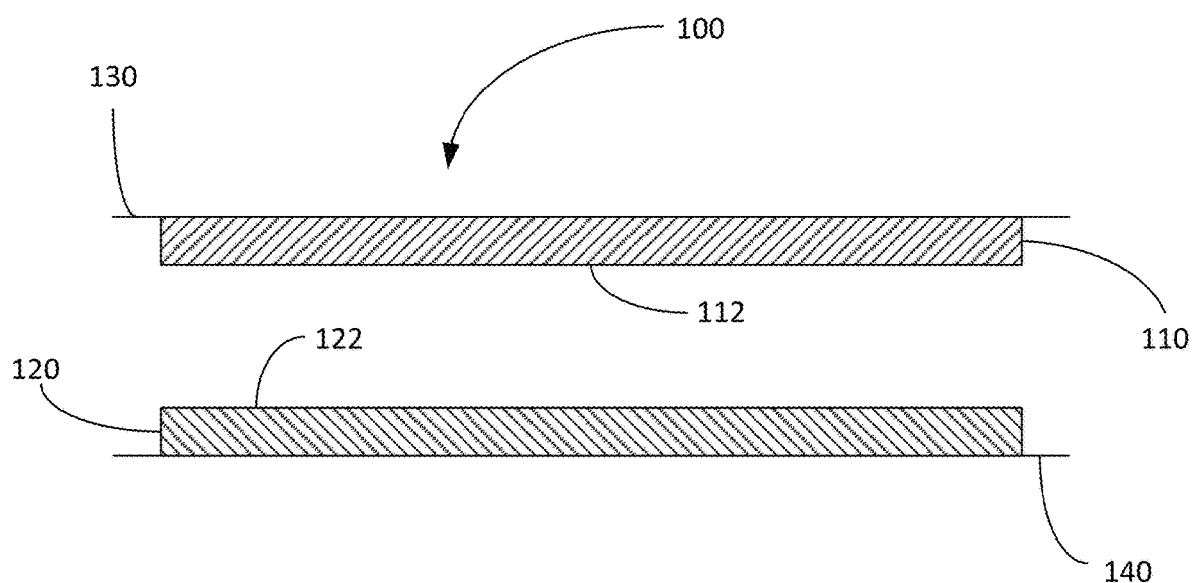
FIG. 1 is a cross-sectional view of a tape closure system in accordance with an embodiment.

Referring to FIG. 1, an embodiment of a tape closure system 100 is shown. The system includes a first pressure sensitive adhesive 110 having a first pressure sensitive adhesive surface 112, and a second pressure sensitive adhesive 120 having a second pressure sensitive adhesive 122. Each of the pressure sensitive adhesives is attached to a surface (130 and 140, respectively). The surface 112 and/or the surface 122 is modified with an additive or material to reduce the tack of the surface. The pressure sensitive adhesive surface 112 may be brought into contact with pressure sensitive adhesive surface 122, and, with the application of limited pressure, the surfaces will stick together to form a closure or seal. The closure can be opened or unsealed by applying a pressure or force to pull the surfaces away from one another.

The respective components of the closure system comprise a pressure sensitive adhesive. The pressure sensitive adhesive may be provided as a transfer tape, a double-sided tape, or coated on a facestock such as, for example, a paper, a film, or a foil. Referring to FIG. 2, an embodiment is shown in which one of the tape components of the enclosure system is provided as a double-sided tape 200. It is noted that the same structure may also be presented in the form of a sheet where the described structures are provided as die cut sheets of various lengths and widths as needed for the particular application. The tape 200 includes an adhesive which could be a heat, ultrasonic, RF activatable, or water, or solvent activatable adhesive, or a pressure sensitive adhesive, including a permanent, removable, or ultra-removable pressure sensitive adhesive 210, a facestock or carrier film or substrate 220, and a pressure sensitive adhesive 230. The upper surface of the pressure sensitive adhesive 230 is modified to provide a surface 232 having a reduced tack. In an embodiment, both the pressure sensitive adhesive 230 and adhesive 210 have a reduced tack on their corresponding surface. In one embodiment, the tape is disposed on a liner 240 when a pressure sensitive adhesive is used. The liner 240 can be a single or a double-sided liner having a release surface (e.g., a silicone release surface) on one or both sides. The liner may be a single-sided or double-sided liner when in sheet form and a double-sided liner when provided as a tape. The liner can be a filmic or a paper liner. In cases, where a PSA is used, the tape is removed from the liner to expose the adhesive 210, which will be used to adhere the tape to a surface (e.g., a surface of a container or package or article). The pressure sensitive adhesive 230 remains exposed and will provide the contact points with an opposing surface or tape to close or seal the package. The pressure sensitive adhesive 230 is modified with an additive or material to provide a reduced tack surface. The tape 200 may be provided as a roll in wound form by winding the tape onto itself so the pressure sensitive adhesive 230 contacts the surface 242 of the liner 240 during storage. The tape may be supplied in bulk to a dispensing unit for applying to a substrate in a package forming process. The tape could be provided, if desired, in an individual dispenser (e.g., similar to a Scotch™ tape dispenser) to manually remove a tape segment or strip as desired.

The sheet and tape embodiments have applications, including closing file folder envelopes, storage bags, gift wraps, and hospital gowns as well as providing an attachment surface to attach things onto surfaces like refrigerator, walls, or any other surface. These applications can span consumer, medical, industrial, office and other market segments where two surfaces need to be temporarily attached and detached. In addition to the above, the embodiment with two reduced tack adhesives may be used for wrapping on itself to hold in place for applications such as wire wrapping, for holding catheters on arms, legs, and other surfaces. This system can also be used for temporary closure with no damage done to the underlying system. For example, the system may be used with gift wrapping, scrapbooking, photo albums, and other applications where it is important not to damage the objects being attached. As described above, one or both parts of the closure system may be modified to provide the reduced tack surface. Referring back to FIG. 1, in one embodiment, the first pressure sensitive adhesive 110 is provided with a modified surface 112. In one embodiment, the second pressure sensitive adhesive 120 is provided with a modified surface 122. In still another embodiment, both of the pressure sensitive adhesives 110 and 120 are provided with modified surfaces. Further, it will be appreciated that the respective tape components (e.g., tape 110 or 120) may be the same or different. For example, the tape components may use the same or different adhesive material. If both pressure sensitive adhesive surfaces are modified, the material providing the modified surface may be the same or different from one another.

One or both of the pressure sensitive adhesives is modified to produce a pressure sensitive adhesive surface having a relatively low, or non-tacky surface. The modified surface having a low or non-tacky surface may also be referred to herein as a "detack surface." The pressure sensitive adhesive is modified by an additive that is either (i) admixed with the pressure sensitive adhesive and coated to form the tape, or (ii) applied to a coated pressure sensitive adhesive surface. The additive employed to modify the surface may be referred to herein as a "detack layer" or "detackified surface." Applying the additive to a coated pressure sensitive adhesive surface may be accomplished by any suitable method including, but not limited to, spraying, sprinkling, printing, brushing, dusting, etc.

The pressure sensitive adhesive employed as part of the tape system is not particularly limited and may be chosen as desired for a particular purpose or intended application. The PSA can be solvent, emulsion, or warm/hot melt based and can be removable or permanent. The PSA can be cured subsequent to coating using any of a number of crosslinking mechanisms such as ionic, hydrogen bonding, chemical, or mixtures thereof and using stimuli such as thermal, UV, IR, or EB radiation. Any of a number of PSAs from suppliers such as Dow, Henkel, BASF, and Avery Dennison can be used for making these two-part tape-based closure systems. Some examples of hot melt PSAs that can be used are HL 8005X, Swiftmelt 82674PW, HL 2811-PW from HBFuller and FA 20, Hammerlock, R128 and Z3000 from Avery Dennison. Some examples of emulsion PSAs are AT20, AT20A, E898 from Avery Dennison. The choice of PSA is dictated by requirements such as adhesion under refrigerator or freezer conditions, adhesion under wet conditions, adhesion to wet surfaces, adhesion under oily and fatty conditions, adhesion to oily and fatty surfaces, adhesion after powdery and other particulate contaminants have been poured across the tape surface, FDA requirements for direct or indirect food contact, etc. The PSA may be provided in a coat weight of from about 10 gsm to about 100 gsm; from about 20 gsm to about 80 gsm; even from about 40 to about 60 gsm. In one embodiment, the coat weight is from about 20 to about 40 gsm.

Figure 3A:
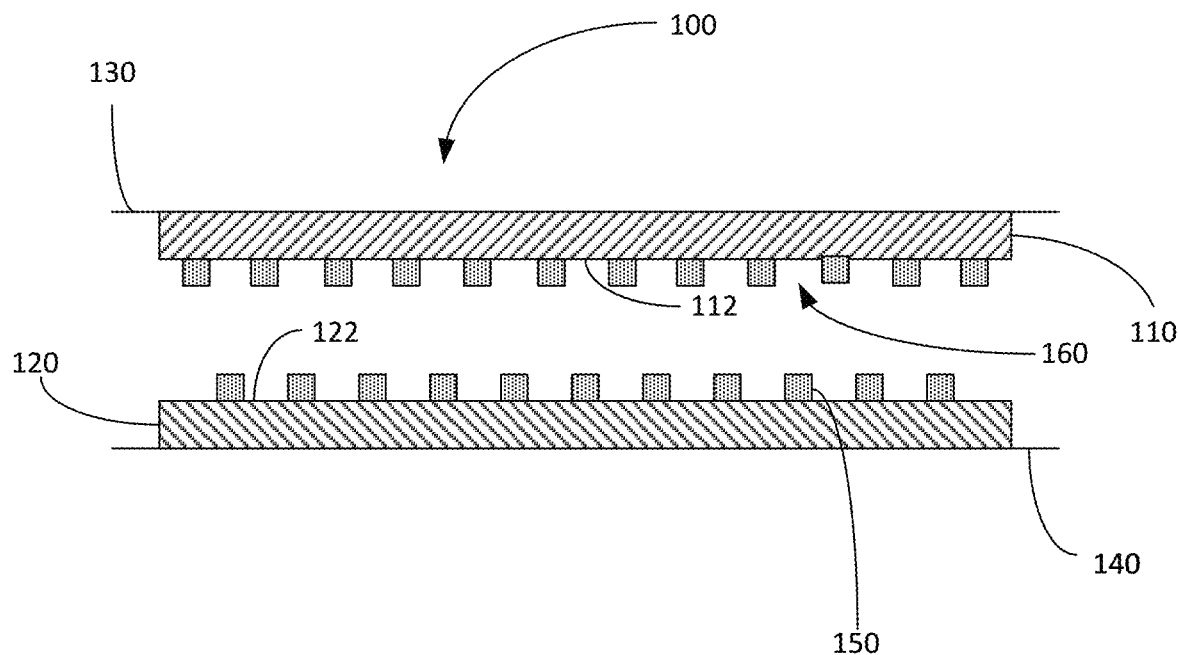
FIG. 3a is a cross-sectional view of a tape closure system in accordance with an embodiment showing details related to the modified surface.
Figure 3B:
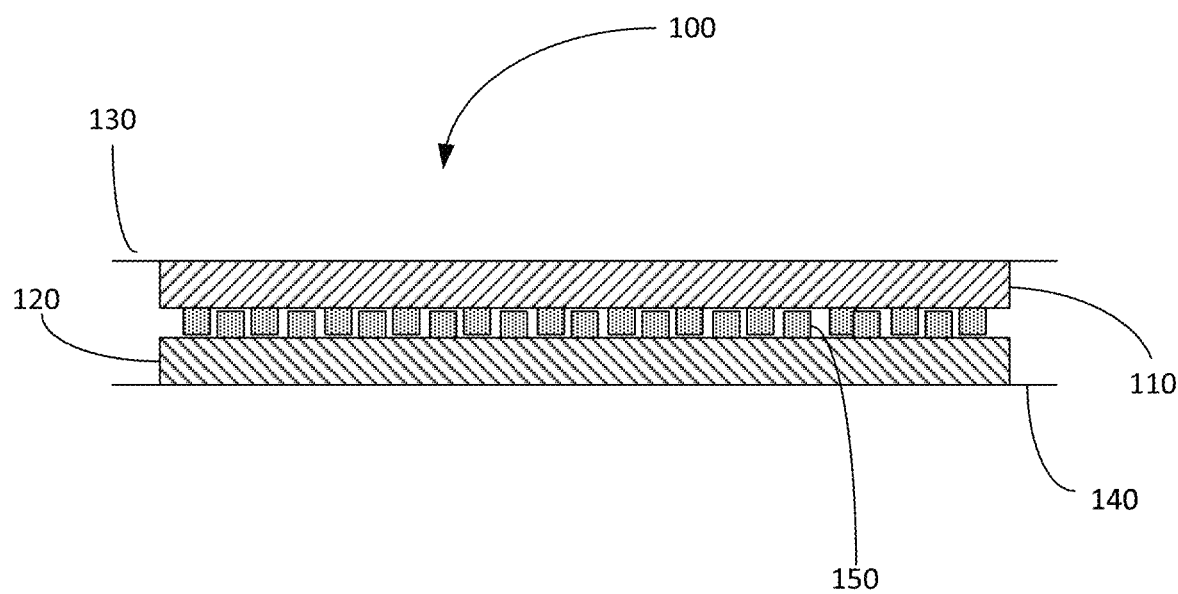
FIG. 3b is a cross-sectional view of the tape closure system of FIG. 3a in a closed configuration.

The pressure sensitive adhesive is modified to provide a modified surface topography that will reduce the tack of the pressure sensitive adhesive. FIG. 3a illustrates a more detailed view of the modified adhesive surface(s). The additive or other material provides a plurality of standoffs (or projections or protrusions) 150 and recessed areas 160. The standoffs provide a partially raised surface area relative to the surface of the adhesive. FIG. 3b illustrates an embodiment of the tape system in a closed configuration when the modified tape surfaces are brought into contact with one another. Without being bound to any particular theory, when a modified surface is brought into contact with the surface of the other tape component, the tacky parts in the recessed areas 160 contact the smooth surface of the other tape component or contact the protrusions 150 if the other tape surface is also provided with a modified surface topography. In another embodiment, there may be areas of adhesives surfaces 130 and 140 that come together and contact one another when the tape components are brought together to provide the closed or sealed configuration. FIG. 3b is a top view of the PSA surface containing the detack material. In this illustration, the filaments sprayed randomly on the PSA surface are illustrated. These filaments are completely random in nature. In one embodiment, more than 50% of the filaments overlap with each other, and cover the PSA surface with coverage ranging from about 5% to about 70%.

The type, modulus, particle size, shape, height, amount, and coverage of the PSA surface with the additive controls the level of tack of the PSA surface and slidability of the finger along the surface. The amount of additive controls the contact made between the PSA of the two surfaces and the peel value when the two surfaces are brought together and bonded using applied pressure. Too little additive provides low surface coverage of the additive, and high contact area between the adjoining PSA surfaces leading to a strong bond, while too much additive leads to a weak bond.

It will be appreciated that FIGS. 3a and 3b are merely illustrative of an embodiment of a modified surface. It will be appreciated that the standoffs may be provided in any arrangement and need not be ordered as shown in FIGS. 3a and 3b. The standoffs defining the detack surface could be provided as a regular repeating array or as a random array. Additionally, the standoffs could be of discrete shapes or non-regular shapes, like lines, filaments, fibrils, ellipsoids etc. The standoffs may be provided by elongated lines, fibrils, or filaments of different lengths and/or thicknesses. (See, e.g., FIGS. 13-22). FIGS. 23-27 illustrate other embodiments of non-regular shapes, e.g., non-regular dots or ellipsoids, or irregular shapes formed when two printed areas merge together. The standoffs do not necessarily have to be ordered such that standoffs on opposing adhesive surfaces do not contact one another. That is, a standoff on one adhesive surface may contact all, or a portion of, or none of, a standoff on the opposing adhesive surface. In one embodiment, at least two of the standoffs partially overlap with one another such that at least one of the standoffs on a first adhesive surface overlaps with at least one standoff on the second adhesive when the first and second adhesives are brought into contact with one another. This would occur, for example, if any of the modified surfaces of FIGS. 13-22 or 23-27 were brought into contact with one another. Further, adhesive on one side of the reclosure could contact adhesive on the other side or a combination of adhesive and standoff on the other side.

In one embodiment, the filler material is admixed with the pressure sensitive adhesive prior to coating. The additive is provided such that, upon formation of the pressure sensitive adhesive surface (e.g., via drying or curing or merely coating), the particles protrude or project from the surface of the adhesive. In another embodiment, the standoffs may be provided by applying an additive or material to a pressure sensitive adhesive. In such embodiments, the additive may be applied to the pressure sensitive adhesive surface by any suitable method including, but not limited to, printing, spraying, sprinkling, dusting, brushing, etc.

The standoffs may be provided in a random array or in a regular or uniform pattern. Methods such as printing may be required to provide the standoffs in a regular/uniform pattern. This allows a user to control the surface topography of the pressure sensitive adhesive. The standoffs may be provided as discrete dots or shapes or may be provided as a series of lines or filaments or fibrils of a uniform or varied (i.e. non-uniform) length or thickness. When provided as lines (including as filaments or fibrils) or shapes of a substantial length, the lines may be provided as uniform or random lines and may be straight, curved, undulating, zigzag, stepped, etc.

Examples of suitable fillers include, but are not limited to, inorganic fillers, polymeric beads, etc. Some specific examples of suitable materials for providing the standoffs include, but are not limited to, hollow Expancel polymeric beads from Akzo Nobel, solid, elastic polymeric beads from any of a number of suppliers, or inorganic fillers such as $CaCO_3$ from JM Huber Corporation. Inorganic fillers and polymer particles may be provided by admixing the inorganic filler or polymer particles into the pressure sensitive adhesive prior to coating. Alternatively, the inorganic filler or polymer particles may be applied to the surface of a pre-coated pressure sensitive adhesive by spraying, dusting, sprinkling, etc.

In other embodiments, the standoffs may be provided by inks, elastomeric materials, polymeric materials, etc. In embodiments, the standoffs may be provided by hot melt or emulsion polymers. In one embodiment, the standoffs are provided by an emulsion polymer. Such materials may be applied to the surface of a pressure sensitive adhesive by any suitable method including, but not limited to, printing and spraying. The modulus of the polymeric or elastomeric material should be in the range from just below Dahlquist criterion ($10^6$ dyne/cm$^2$) and higher. In embodiments, the elastomeric or polymeric material has a modulus of about $0.5 \times 10^6$ dyne/cm$^2$ or greater. Various hot melts can be used for spraying onto the PSA surface, such as Advantra PHC 9200 (softening point (SP) of 102° C.) from HB Fuller, 3H049B (SP of 82° C.), HL 7216 (SP of 74° C.), PHL 4157 (SP of 67° C.), HL-0842S (SP of 155 C), Swifttherm 84659 (SP of 117° C.) etc.

In one embodiment, spraying with a hot melt polymer can be carried out using any suitable spray system. An example of a suitable spray system includes, but is not limited to, a Nordson Universal spray nozzle system. Any of a number of different nozzle types to control the filament size and pattern may be used to accomplish spraying. Some nozzle types include the Continuous signature nozzles, Intermittent signature nozzles, and Control coat nozzles made by Nordson.

The samples of the PSA surface sprayed with the filaments of the detack material were produced at the Nordson Labs in Duluth, Ga. either on a benchtop spray unit or on a roll to roll unit. For benchtop trials, a laminate of a pressure adhesive coated on a film and protected with a liner was used. For the trial, the protective liner was removed and the film with the exposed PSA side facing up was placed on the tabletop web, web turned on to the desired speed and the PSA surface was sprayed with the non-tacky elastomer.

For the roll to roll trial, a 1 mil PET film pre-coated on one side with a hot melt PSA and protected with a double-sided liner was coated at Nordson with a hot melt rubber based PSA on the uncoated side of the PET using a slot die with rotating rod (to smooth the coating) at the desired coat weight and the freshly coated and exposed PSA surface was sprayed with the detack material. After spraying, the laminate was self-wound with the double-sided liner protecting both the PSA layers—one side with just the PSA layer and the other side with the detack spray on the PSA surface.

Hot melt elastomers are used as the preferred detack spray materials with melt viscosities ranging from about 300 to about 3000 cps (at 275 to 350° F.). The spray nozzles used were continuous signature, intermittent signature or control coat nozzles. The nature of the spray pattern produced by these different nozzles is shown in FIG. 33. These spray units are commonly used to deposit very high levels of spray material in, for example, non-woven applications or for spraying adhesives for heat lamination applications. In one embodiment, a small quantity of the spray material was used on the surface of the PSA using a large amount of air to create a fine spray randomly spread across the PSA surface.

In one embodiment, surface coverage of the PSA surface with the detack material ranged from about 10% to about 70%.

FIGS. 12 through 22 and FIGS. 28 and 29 show different embodiments of coverage of the detack material on the PSA surface. For these trials, the surface of the PSA was at ambient temperature before it reached the spray station and the fibrils/filaments of the detack material were deposited on the PSA surface. The width/thickness of the filaments ranged from few microns (10μ or so) to several tens of microns (100μ or more). The length of the filaments are several orders of magnitude larger than the width, ranging from about 1 mm and longer. The length of the filament depends on the intrinsic properties of the elastomer and on the processing conditions. Each of the 1 inch wide Nordson nozzle modules has about 10 orifices, and multiple patterns of air blows around the filaments exiting these orifices, before the filaments float down to the PSA surface. Due to the air flow, there is substantial overlap between the adjoining filaments as they settle on the surface (seen in FIGS. 12 through 16). Depending on the temperature of the PSA surface and the filament temperature, in certain embodiments there is a possibility of slight penetration of the PSA surface by the filament. The pattern of the spray is completely random as seen from the Figures. The filaments are deposited onto the surface by falling onto the surface. There is no defined base or tip or geometry to the structure and the structure comprises entirely random filaments deposited on the surface with overlap/stacking happening randomly.

In FIGS. 12 through 22, a removable adhesive from Fuller (HL 8005X) was used. Three different coat weights of the adhesive were sprayed with Fuller Advantra PHC 9200. Since the peel adhesion of this adhesive is low, a lighter surface coverage (ranging from about 15 to 30%) with the filaments was targeted initially, thus leaving a large land area of the PSA surface to get adequate T peel values upon bringing the 2 modified surfaces together. Table 2 lists the percentage of the PSA surface covered by the fibers/filaments. The lower surface coverage with the detack material was adequate to get reasonable finger slidability (rating of 4 to 5) indicating that a solid object could easily slide across its surface so long as the weight (force) exerted by the object onto the surface was low (such as by a particle of cheerios). Three different types of nozzles were used in the study—Nordson low flow continuous signature nozzle (FIGS. 12 through 16), Nordson Intermittent Signature nozzle (FIGS. 17 through 19) and Nordson Control Coat nozzle (FIGS. 20 through 22). With both Intermittent and Control coat nozzles, there were a lot of lumpy large protrusions (nodules) in the fibrils/filaments (seen in FIGS. 17 through 19) which acted as large spacers projecting away from the surface of the PSA. With the control coat spray nozzle, pattern air pressure was increased to lower the filament size and thereby eliminate the nodule formation. In one embodiment, the filament size and nodule formation were substantially reduced by increasing the pattern air pressure. The large spacers are detrimental to the ease of closing the two tape sides and because of their large size (some of the order of a 1 mm or larger) act to open the bond with time. In one embodiment, a low flow continuous signature nozzle was used.

Figure 28:
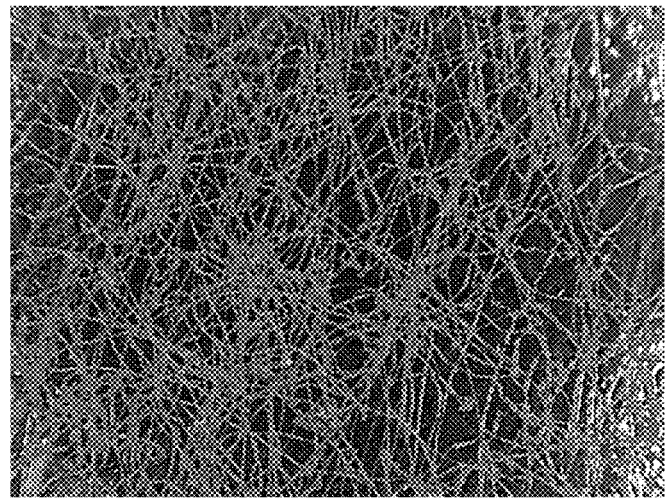
FIG. 28 is a micrograph of a surface of a modified pressure sensitive adhesive (Fuller HL-2811) sprayed with Fuller Swifttherm 84659 at a high surface coverage of the 84659.
Figure 29:
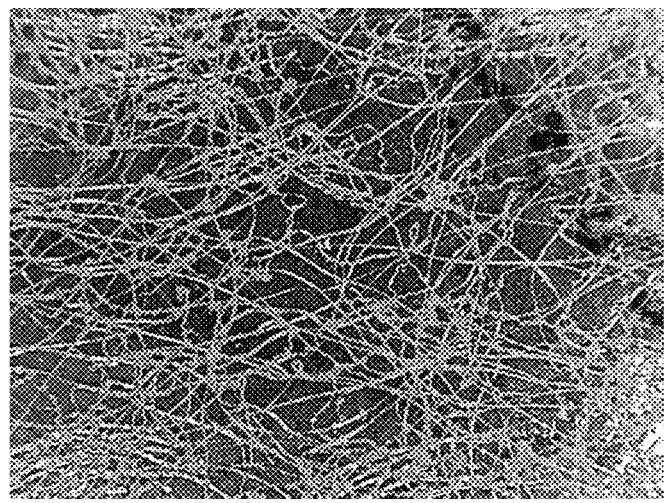
FIG. 29 is a micrograph of a surface of a modified pressure sensitive adhesive (Fuller HL-2811) sprayed with Fuller Swifttherm 84659 at a 20% higher surface coverage than that of FIG. 28.

For FIGS. 28 and 29, a permanent PSA from Fuller (HL-2811) was used. The T peel data of this PSA laminate attached to itself without any detack layer was a very high 21 N/inch indicating very high bond strength. This PSA was coated onto a 1 mil PET film on the Nordson roll to roll unit at 30 gsm of adhesive coat weight, and sprayed with Fuller Swifttherm 84659 (SP of 117° C.) using the continuous signature nozzle. The process conditions were identical, the main difference being the spray material throughput being 20% higher for FIG. 29. FIG. 28 had surface coverage of the filaments of 44.3% vs 46.8% for FIG. 29, both had filament width/thickness of around 31p, friction of FIG. 28 was 0.52 lb vs 0.48 for FIG. 29, and T peels were 7 N/inch vs 5.8 N/inch. Interestingly the T peels after 10 cheerio exposures were 1.6 N/inch vs 0.3 N/inch. FIG. 28 is acceptable for the application showing good closure strength of about 7 N/inch and after significant exposure to cheerios still gave an acceptable 1.6 N/inch for adequate bag closure strength. The figures show a high degree of overlap/stacking of the filaments consistent with higher throughput, coverage and pattern air pressure.

Various hot melt elastomers can be used for spraying onto the PSA surface, such as Advantra PHC 9200 (softening point (SP) of 102° C.) from HB Fuller, 3H049B (SP of 82° C.), HL 7216 (SP of 74° C.), PHL 4157 (SP of 67° C.), HL-0842S (SP of 155 C), Swifttherm 84659 (SP of 117° C.) etc. The finger tack, slidability and the peel force after closure and opening can be regulated by choice of SP of the material used—higher the softening point, easier is the slidability (lower finger tack) and lower T peel on closure for a given closure force.

The spray pattern can be varied by manipulating a number of process variables, including but not limited to temperature of the spray material (and hence viscosity), the pattern air pressure (higher pressure gives finer fibrils/filaments, lower pressures giving thicker filaments), pump speed or throughput (which regulates the amount of material being deposited and hence coverage), distance between the spray unit and the PSA surface and the web speed.

In one embodiment, the width of the spray nozzle module is 1" and the nozzles are mounted side by side to get wider spray patterns to cover a wide web. Since the spray modules are contiguous, there will be some overlap of the spray between the modules further leading to overlap of the filaments. So, the detack filaments will range from single filament on the PSA surface and in some cases many filaments stacked on top of each other.

The pattern of filaments on the surface is completely random. When two such surfaces are brought together, there is no intermeshing or particular order in which a bond is formed. The bond strength is determined by a number of factors—the type of adhesive used (and its inherent bond strength as determined by its chemistry, modulus, crosslinking, coat weight), the modulus and softening point of the filaments, the height of the filaments (which will vary randomly across the surface due to stacking or overlap in certain regions), the percentage of the surface of the PSA covered by the filaments. As the surfaces are brought together, the interactions are likely to be between the open areas of PSA of side A with open areas of PSA of side B, PSA of side A forming a bond with filaments of side B and vice versa.

Liquid based inks can also be used for modifying the PSA surface to provide the standoffs. The inks can be either printed or sprayed. In the lab, a multi-purpose Professional air brush kit such as from Apontus can be used for modifying the PSA surface to provide low to no tack, with good self-stick characteristics.

FIGS. 23 through 27 show the spray coated water-based ink system (Colorcon FGN 3427 black ink) onto the surface of several PSAs. As can be seen from the figures, the pattern is very random in nature and a significant number of particles are not all separate and discrete.

FIG. 23 used AD FA20 adhesive at a coat weight of 30 gsm and the Colorcon FGN 5427 was sprayed onto the surface using the Apontus spray system at ink coat weight of 7.7 gsm. The ink surface coverage was 12.2% and the T peel of this laminate system was 3.3N/inch. The ink in the figures shows up as the dark spots on the light background, the background being the PSA.

FIG. 24 also used FA20 adhesive at a coat weight of 30 gsm and the Colorcon FGN 5427 was sprayed onto the surface using the Apontus spray system at ink coat weight of 9.3 gsm to give a surface coverage of 19.4% and the T peel of this laminate was 3.3 N/inch.

FIG. 25 used AD R-128 adhesive at a coat weight of 30 gsm and the Colorcon FGN 5427 was sprayed onto the surface using the Apontus spray system at ink coat weight of 7.8 gsm. The ink surface coverage was 14.6% and the T peel of this laminate system was 4.2 N/inch.

FIG. 26 used AD R-128 adhesive at a coat weight of 30 gsm and the Colorcon FGN 5427 was sprayed onto the surface using the Apontus spray system at ink coat weight of 9.8 gsm. The ink surface coverage was 24.6% and the T peel of this laminate system was 2.6 N/inch.

FIG. 27 used AD Z-3000 adhesive at a coat weight of 30 gsm and the Colorcon FGN 5427 was sprayed onto the surface using the Apontus spray system at ink coat weight of 9.9 gsm. The ink surface coverage was 24.3% and the T peel of this laminate system was 3.6 N/inch.

The particle size of the particles in FIGS. 23 through 27 as measured by Vertical Scanning Interferometry ranged from about 2 to about 25 microns.

The adhesion (peel value) of the resulting modified PSA can be varied using a number of variables including, for example, the type of PSA and the coat weight, the height of the standoffs, the diameter or width of the standoffs, the modulus of the standoff, the coat weight of the additive, and the surface coverage. The peel value is also dependent on the flexural modulus and stiffness of the laminate controlled by a number of factors: modulus and stiffness of the facestock material such as PET, BOPP and such, the type of PSA (stiffness and coat weight, i.e. thickness) used to laminate the tape to the bag and the stiffness of the bag material. All these can be manipulated to control the level of detackiness and the adhesion.

The height of the standoffs may be selected as desired for a particular application or intended purpose. Smaller standoffs (i.e. lower height standoffs) will provide a higher level of adhesion between the tapes, which will provide a tighter seal and require a greater force to open the closure. The height of the standoffs may range from a few microns to several hundred microns. In one embodiment, the height of the standoff is from about 2 µm to about 500 µm; from about 10 µm to about 300 µm; from about 25 µm to about 250 µm; from about 50 µm to about 150 µm; even from about 75 µm to about 100 µm. Intermediate heights can be achieved using non-tacky or slightly tacky microspheres or fillers such as $CaCO_3$ having diameters in the range of interest such as 10 to 100 µm. Larger heights can be achieved using the Nordson spray unit.

In embodiments, the standoffs may have a diameter, circumference, or thickness of from about 5 µm to about 500 µm; from about 10 µm to about 250 µm; from about 25 µm to about 150 µm; even from about 50 µm to about 100 µm.

The dimensions of the standoffs and the space between the standoffs and/or surface coverage of the standoffs may be varied to control the bond strength of the reclosure system. For example, the larger the height of the standoff, the greater the distance may be between the standoffs to still achieve a relatively high adhesion. The adhesion is controlled, however, to allow for sufficient adhesion when the modified tape surfaces are brought together but separated from one another on application of a suitable force.

The coat weight of the printed or sprayed standoffs may be in the range of from about 2 gsm to about 40 gsm; from about 5 gsm to about 30 gsm; even from about 2 to about 25 gsm.

The standoffs, whether premixed with the pressure sensitive adhesive or later applied to a pressure sensitive adhesive surface, may be provided at a concentration to provide a particular surface coverage. The standoff surface coverage will also contribute to the level of adhesion between the tape surfaces. In embodiments, the standoffs cover from about 5% to about 60% of the total surface area of the pressure sensitive adhesive; from about 10% to about 50%; from about 15% to about 45%; even from about 20% to about 30% of the total surface area of the pressure sensitive adhesive.

The peel value is also dependent on the flexural modulus and stiffness of the laminate controlled by a number of factors including, for example, the modulus and stiffness of the facestock material such as PET, BOPP, etc., and the type of PSA (stiffness and coat weight, i.e. thickness) used to laminate the tape and the container material.

The T peel value of the tape to tape laminate (attached to the bag material) can be tailored depending on the application, ease of opening and the number of reclosures needed, and can range from as low about 0.2 N/inch to about 20 N/inch; from about 0.5 N/inch to about 10 N/inch; from about 1 N/inch about 5 N/inch; even from about 2 N/inch to about 4 N/inch. In embodiments, the system has a T Peel value of at least 0.5 N/inch or higher after 10 reclosures. In embodiments, the system has a T Peel value of 0.5 N/inch to 15 N/inch; from 1 N/inch to 10 N/inch, or from 2 N/inch to 4 N/inch after 10 reclosures. Methods of evaluating T Peel are described herein.

The tape product can be further enhanced by using colored inks or other colored additives in the spray, ink, or additive such that one part of the tape has color A, and the other part of the tape has color B so that when the tapes are adhered to one another and arranged in a closed or sealed configuration it leads to a secondary color C indicating that complete closure has taken place. Other functionalities can be contemplated in the tape (either formulated in the adhesive or in the surface modifier) such as tamper evidence, proof of sterilization, anti-bacterial feature to prevent ingress of pathogens, oxygen absorption feature to prevent ingress of oxygen, a PSA that is water resistant to create a waterproof seal, and such.

The tape may be sized and dimensioned as desired for a particular purpose or application. In one aspect, the tape may be sized with a desired width and length to allow for attachment of the tape to a substrate at a desired or selected processing speed. In embodiments, the tape may have a width of from about 0.25 inches to about 3 inches; from about 0.5 inches to about 2 inches; or from about 1 inch to about 1.5 inches. The tape length may vary as desired. In embodiments, the tape has a length of from 0.5 inches to about 60 inches; from about 1 inch to about 45 inches; from about 2.5 to about 30 inches; from about 5 to about 25 inches; from about 10 to about 20 inches.

The tape closure system can be used for a wide range of closure applications and articles utilizing such enclosures. In embodiments, the tape is particularly suitable for use with a flexible package, or a flexible substrate that is attached to a rigid package structure (including, by way of exemplary embodiments, a film or foil lid attached to a plastic cup or holder). The tape closure system may be applied to a variety of materials that are employed to make such containers or packages. Flexible packages may be made from a variety of materials including, by way of exemplary embodiments, polymeric materials, paper, nonwoven materials, foils, and other such materials. Polymeric films are often used to make flexible packages. Suitable polymeric films include, by way of exemplary embodiments, polyolefins, polyesters, nylon materials, etc. Films are typically biaxially oriented polypropylene films, but may be polyester, nylon, cellophane and/or polylactic acid films. Polymeric films produced with a cast or blown process can be used, but their lower machine direction tensile strength and excessive extensibility under tension or under thermal exposure may prevent adequate lamination. These biaxially-oriented polymeric films are typically used as the outer film and the inner film in a composite laminated structure. The above-identified embodiments are exemplary and for the sake of brevity not all applicable package structures are included. The present teachings, however, can apply to any type or configuration of package structures.

Examples of suitable flexible packages include, but are not limited to:
  Pillow pouch packages. These packages are sealed on the top and bottom of the package with a vertical seam. Such packages are used with cereal, potato chips, pretzels, etc. The packages may be formed from any suitable material, including, without limitation any type of food safe material.
  Stand up pouches, which are typically employed with candy, snacks, liquids, etc. The pouches may be formed from any suitable material, including, without limitation any type of food safe material. Moreover, the pouches may be of any configuration and are not limited to those shown.
  Flat bottom bags used for coffee, pet food, or to store large volumes of material. The flat bottom bags may be formed from any suitable material, including, without limitation any type of food safe material.
  Double seam consumer bags (e.g., bread bags). The double seam consumer bag may be formed from any suitable material, including, without limitation any type of food safe material.
  Bar wrap packages (e.g., for candy bars, snack bars, protein bars, etc.). The bar wrap packages may be formed from any suitable material, including, without limitation any type of food safe material.
  Flexible overwrap packages (e.g., for cookies). The flexible overwrap packages may be formed from any suitable material, including, without limitation any type of food safe material.
  Flexible lid on a rigid package. The flexible lid may be formed from any suitable material, including, without limitation any type of food safe material.

Persons skilled in the packaging art will understand and appreciate the types of packages described above and will understand that the present teachings apply to any applicable configuration of packaging.

The tape closure system can be employed in articles and packages used for a variety of applications and to store a wide range of materials. The tape may be used in articles as for packaged goods such as pet food bags; prepackaged foods such as cereal; snacks such as chips, cookies, crackers; pre-packaged cheese and meats; confectionary; coffee; nutritional foods; food storage bags; other applications such as in personal care (tissues, diaper tapes and such), or medical, industrial, and other business to business applications. These tapes can also be used for pre-made bags which are used to store all kinds of food and non-food items.

Figure 2A:
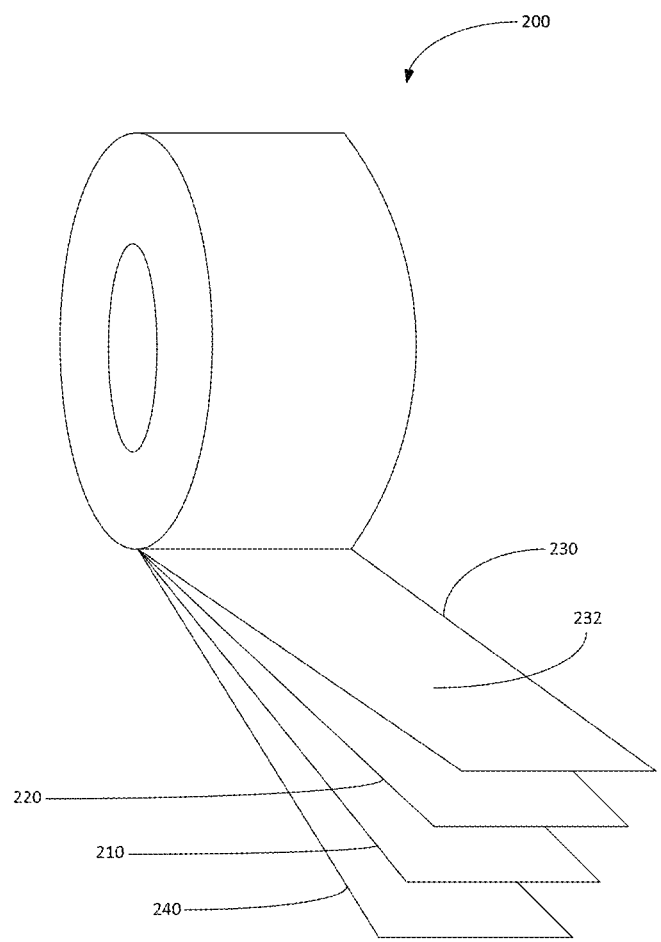
FIG. 2a is a perspective, partial exploded view of a tape in accordance with an embodiment of the invention.
Figure 2B:
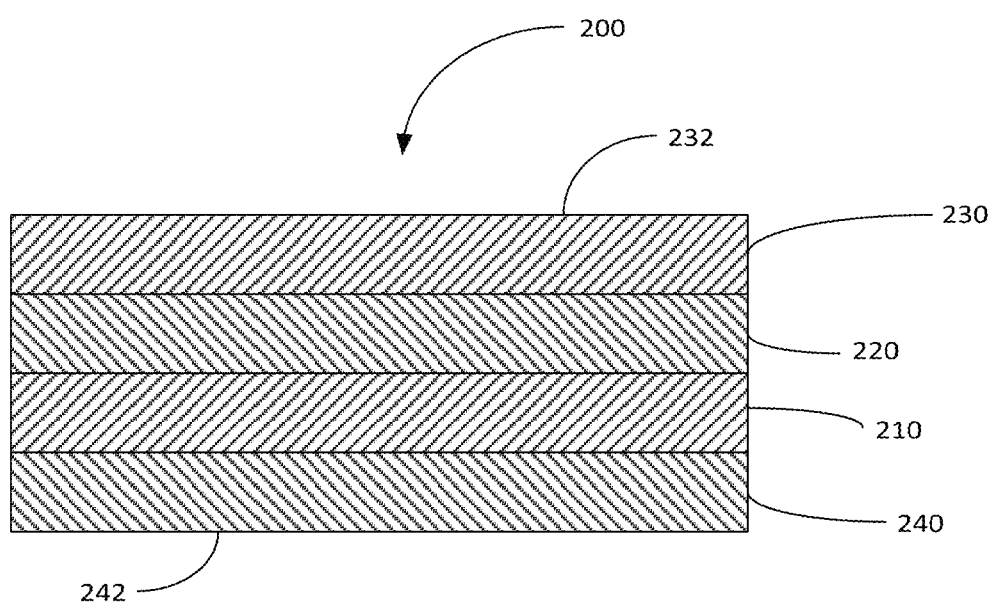

In one embodiment, the tape may be attached to the flexible substrate. The tape employed may be a two-sided tape (e.g., as illustrated in FIG. 2a and FIG. 2b). The substrate facing adhesive (e.g., adhesive 210) is chosen to impart appropriate adhesion to the flexible material of the substrate.

The two-part adhesive system is applied to the surfaces of the article that are to be joined together to selectively close or seal the article. By way of a non-limiting example, in a package (e.g., a food package) provided as a bag, the article (or more specifically the package) may comprise opposing sidewalls formed from a flexible material each having an inner surface with an opening at one end between the two sidewalls. Referring to FIG. 1, the surfaces 130 and 140 may, for example, represent the surfaces of the sidewalls. A thin PSA layer may be used to attach the tape to the bag. A thin PSA layer is desirable to minimize the I-beam effect and lower the overall stiffness of the laminate. Suitable PSA's for bag attachment includes but are not limited to, Avery Dennison S246, Avery Dennison Hammerlock etc. The adhesive closure system is provided by providing a first adhesive on a surface of the sidewall and a second adhesive on the surface of an opposing sidewall, where the adhesive closure system is such that one or both of the adhesives is modified with a plurality of standoffs defining the modified surface topography to provide the reduced tack system. It is, of course, contemplated, that the adhesive closure system may be used in other packages and not just limited to conventional bag type packages. For example, the closure system could be used in a package with a "peel away" opening. Further still, a plurality of tape closure systems may be utilized on a single package. By way of a non-limiting example, two, three, four or more such tape closure systems may be utilized in conjunction with a single package. For example, a package may include two open ends whereby one tape closure system is operatively positioned on one end and a second tape closure system is operatively positioned on the second end. Any such configuration is contemplated hereby.

The tape may be applied to the flexible material in any suitable manner. The tape can be attached to the flexible material using automatic dispensing equipment in a continuous or intermittent manner. The tape can be attached through a manual process as well. The tape could be applied to the flexible material in the same direction as the packaging material web or the package making process (i.e., in the machine direction (MD)), perpendicular to the packaging material web or the package making process (i.e., in the transverse direction (TD)), or in any direction that is efficient to the applicable system. For example, the direction could be at a generally 45-degree angle relative to the direction of the packaging material web or package making process. The present teachings contemplated any variation of such angles. A tape dispensing mechanism may be incorporated into the unit to form the packaging. The tape dispensing mechanism may be of any appropriate configuration and type. The tape dispensing mechanism can allow for modifications to the location at which the tape is applied, can have a standard location that is not readily adjustable, or can comprise a combination of such. The tape dispensing mechanism may be manually controlled or controlled through a processor device, e.g., a computer or the like.

Figure 4:
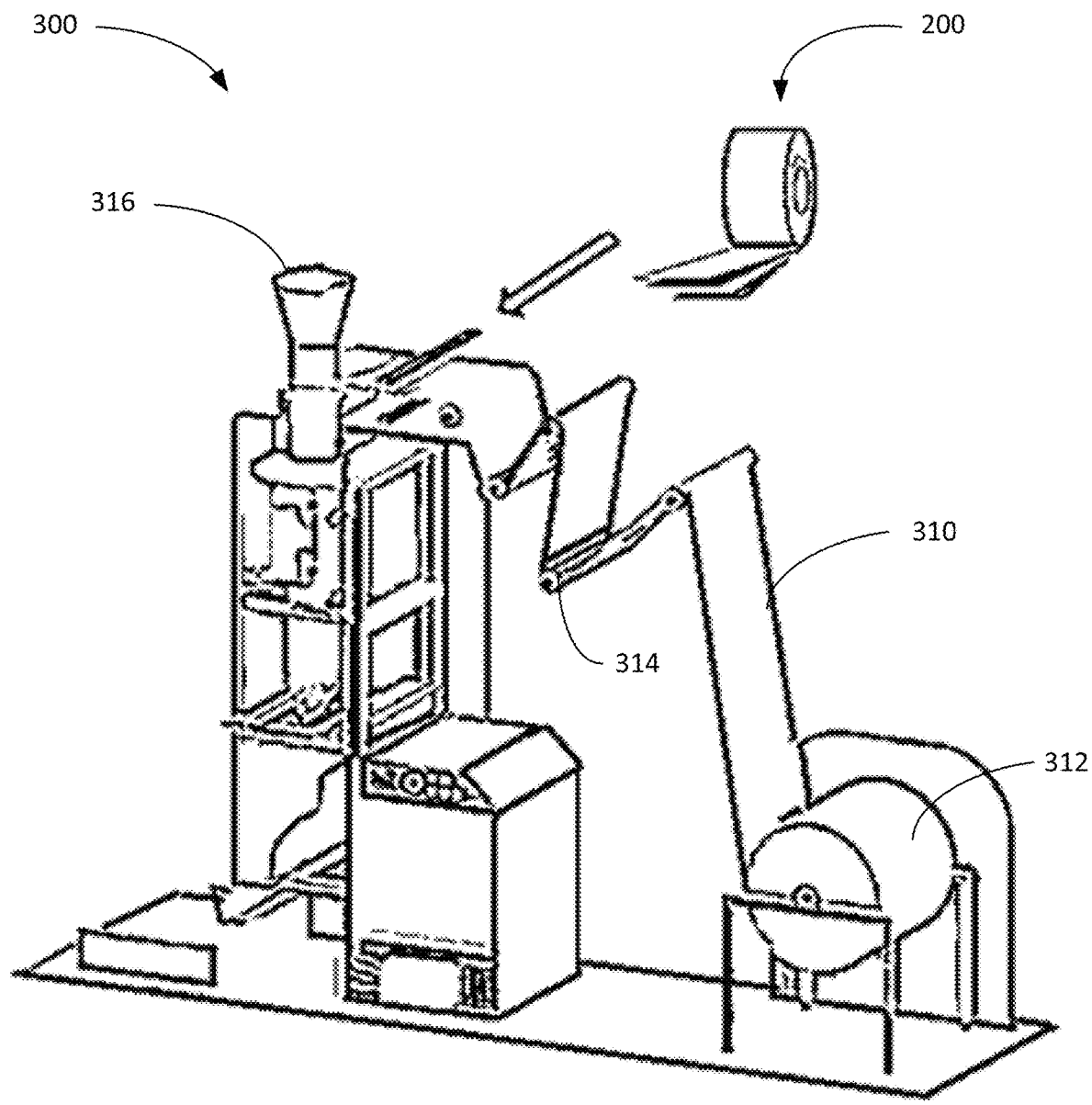
FIG. 4 is a plan view of a vertical form fill and seal system.

The tape can be applied to the flexible material off line and prior to filling the package, or the tape can be applied to the flexible material "in situ" as the bag is formed and filled with the desired contents. In embodiments, the tape is applied to the package in situ as the bag is filled with the desired contents. The tape can be applied in systems including vertical form fill and seal systems 300 and horizontal form fill and seal systems 400. It should be understood, however, that these are merely exemplary locations and that the tape can be applied in any appropriate direction relative to the applicable package. An example of a vertical film form and seal system 300 is illustrated in FIG. 4. Such systems are known to those skilled in the art. In such systems, the applicable contents are poured into the package using gravity. FIG. 4 illustrates a system 300 in which packaging film 310 is taken from a roll 312 of film and passed through tensioners 314 that keep it taut. The film then passes over a former, which directs the film into a vertical tube around a product 50 delivery cylinder 316. The tape system is provided by applying tape 200 to a section of the film. The tape 200 is applied to selected parts of the film transverse to the direction in which the film is being fed. As the tube is pulled downward by drive belts, the vertical tube of film is sealed along its length by a vertical sealer, forming a back seal. The machine then applies a pair of heat-sealing jaws against the tube to form a transverse seal. This transverse seal acts as the top seal on the bag below the sealing jaws and the bottom seal on the bag being filled and formed above the jaws. After the transverse seal has been formed, a cut is made across the sealed area to separate the finished bag below the seal from the partially completed bag above the seal. The film tube is then pushed downward to draw out another package length. Before the sealing jaws form each transverse seal, the product 50 to be packaged is dropped through the product delivery cylinder and is held within the tube above the transverse seal. It will be appreciated that the system FIG. 4 is just one example. Although, it should be understood that the package may be filled in any appropriate manner—especially depending upon the contents to be inserted in the packaging. By way of a non-limiting example, the contents may be filled into the packaging utilizing pneumatic pressure, hydraulic pressure, physical force, pushing force, or any such manner. Further, the contents may be inserted into the packaging through use of separate tools, e.g., blades, arms, etc. In accordance with some embodiments, the tape is dispensed in the transverse direction to form the reclosure mechanism.

Figure 5A:
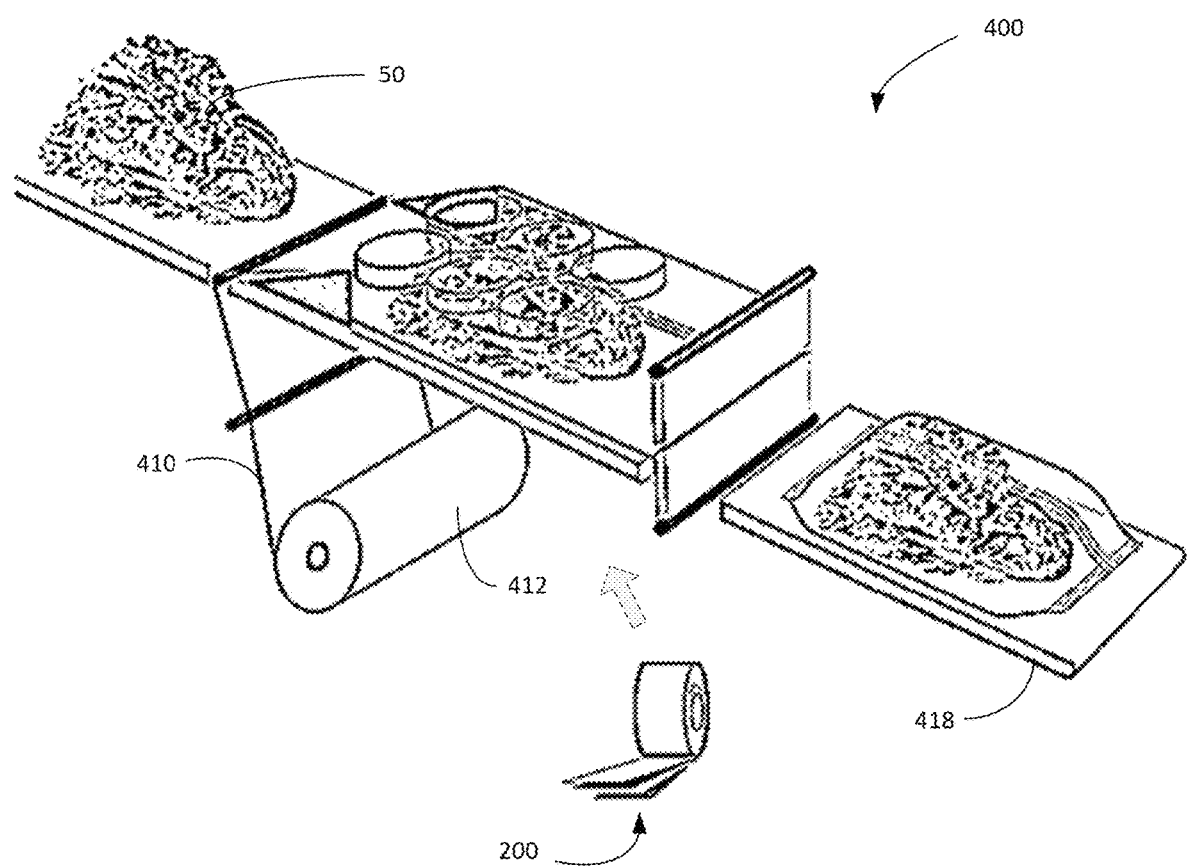
FIGS. 5a-c is a plan view of a horizontal form fill and seal system.
Figure 5B:
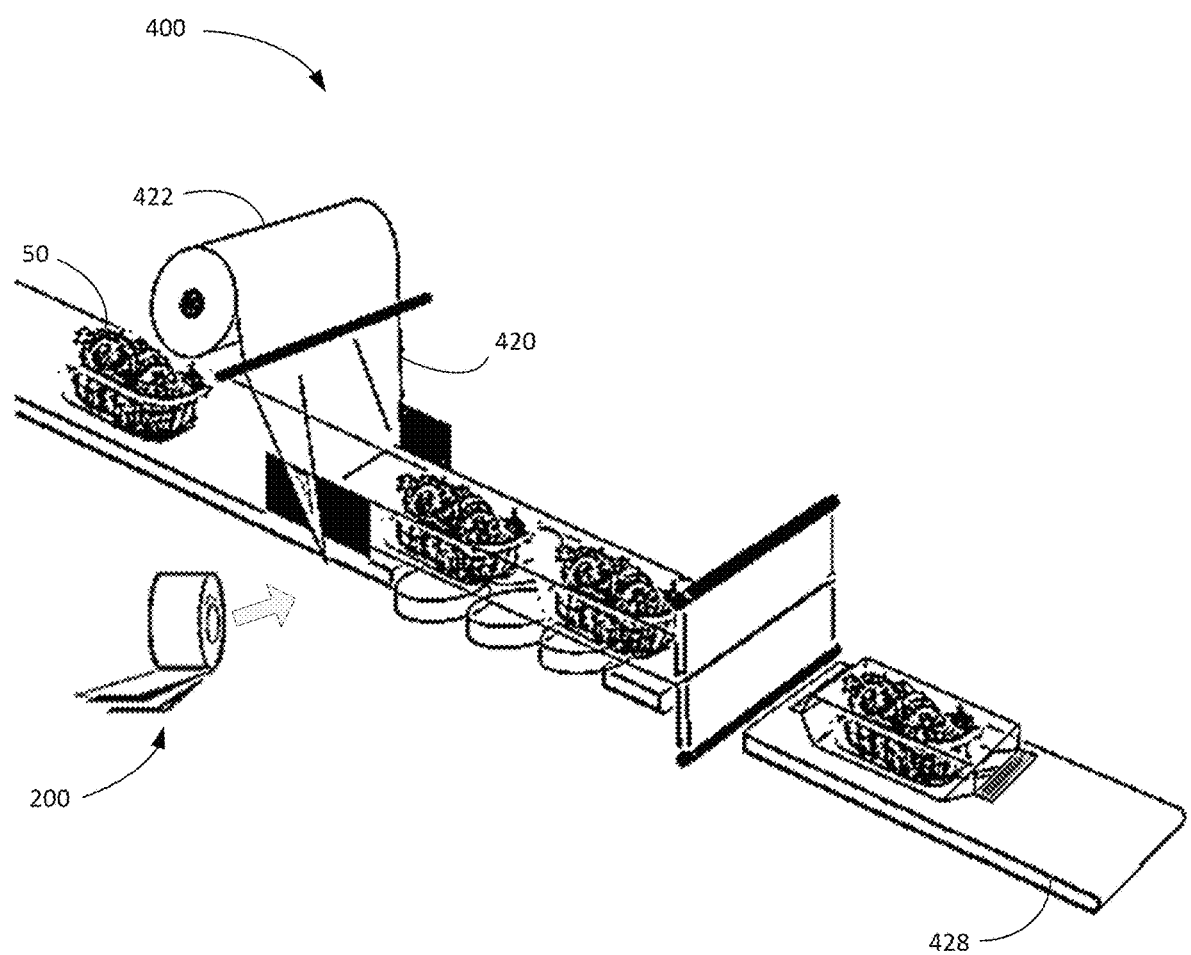
Figure 5C:
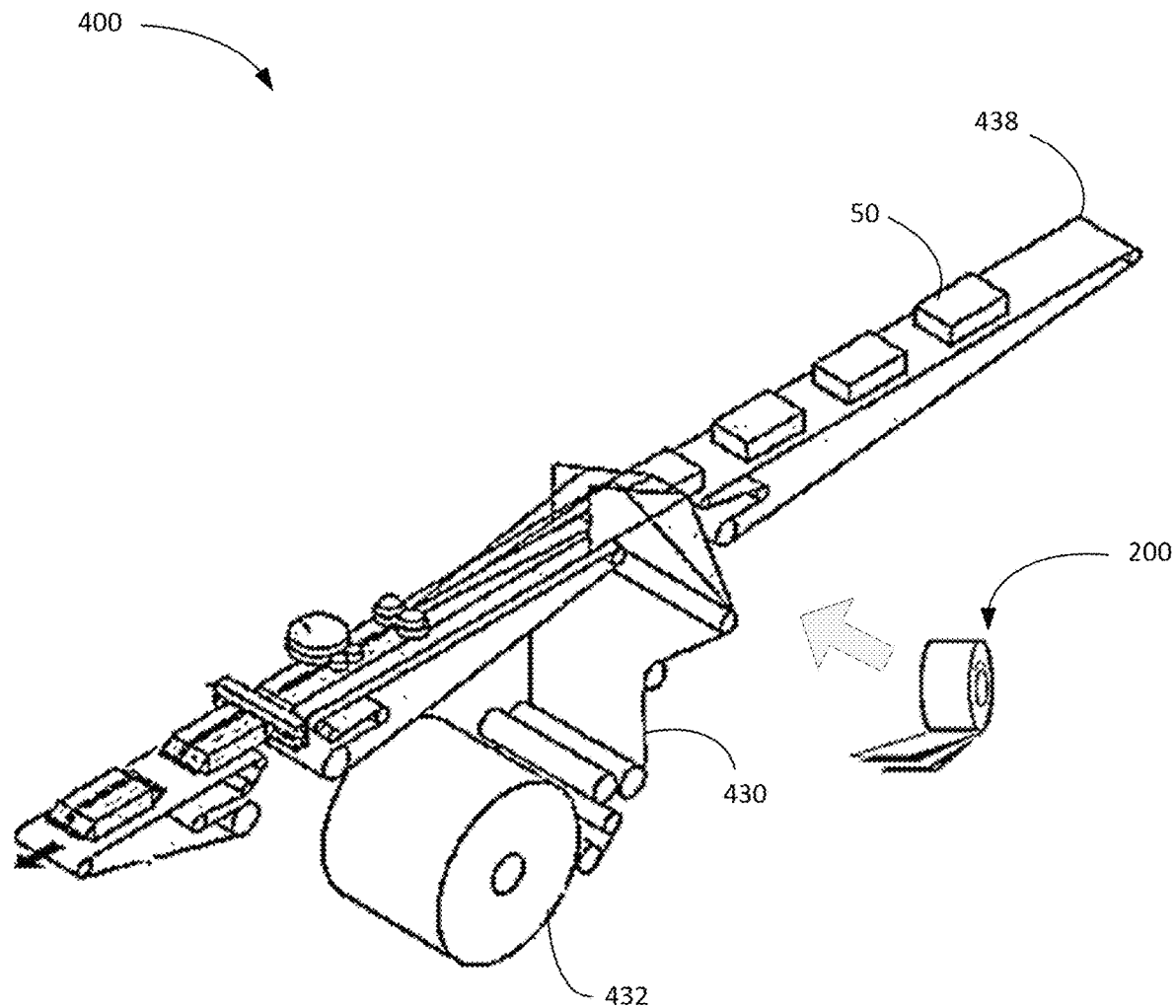

Examples of horizontal form fill and seal systems 400 are shown in FIGS. 5a-5c. In such systems, the product 50 is moved on a conveyor belt 418, 428, 438, and the flexible package is wrapped and sealed around the product. In accordance with some embodiments, a closure system formed from the present tapes is provided by applying or dispensing the tape in the transverse direction relative to the direction in which the package is formed. The present teachings are not limited to this configuration. The tapes may be applied to the packaging in any applicable direction and are not limited to those described herein. The descriptions are merely exemplary and are not intended to be exhaustive.

Figure 6:
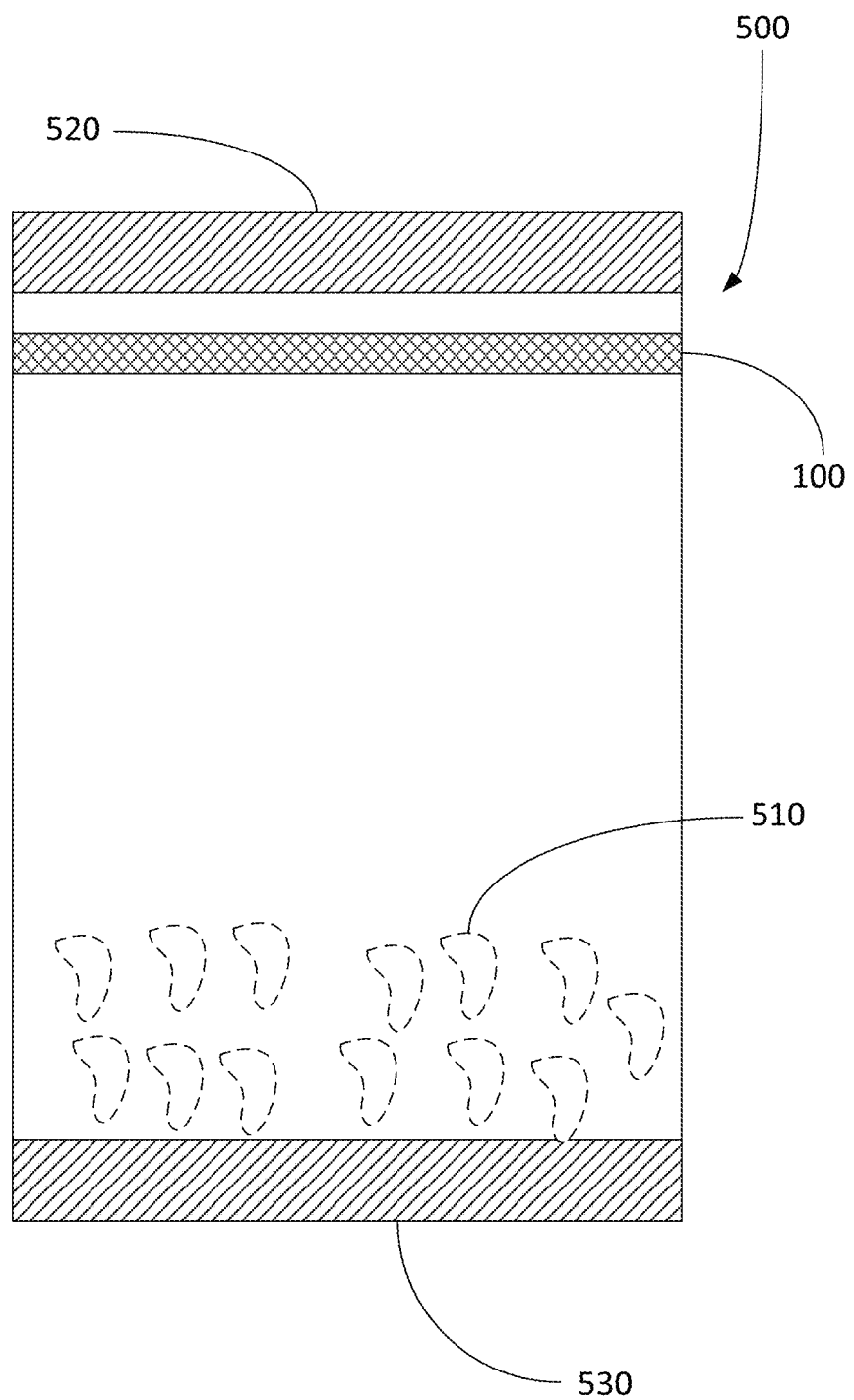
FIG. 6 is a plan view of a front of a package employing a tape closure system.
Figure 7:
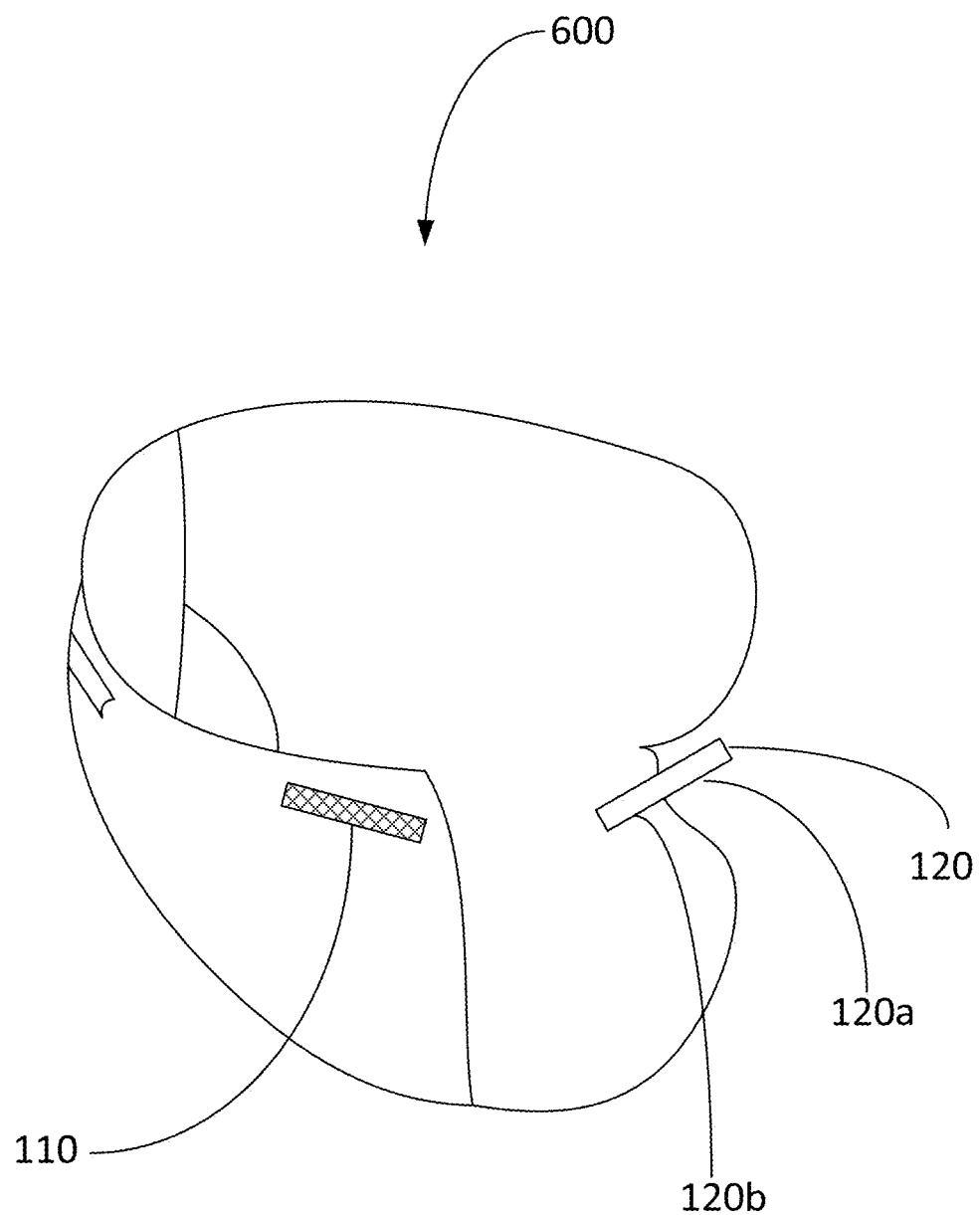
FIG. 7 is a perspective view of a diaper employing a tape closure system

FIGS. 6 and 7 illustrate examples of environments in which the tape closure system may be employed. FIG. 6 illustrates a package 500 (as may be formed by any suitable method) for storing a material (e.g., a food product) 510. The package includes an end seal 520 at a first end of the package, and an end seal 530 at the other end of the package. End seal 520 may be broken and separated to open the package. The package includes a tape closure system 100 for selectively resealing the package as may be desired.

FIG. 7 illustrates a diaper employing a closure system in accordance with the present technology. The diaper 600 includes a tape system 100 that includes a tape 110 disposed on a front face of the diaper and a tape 120 disposed on an edge of the back panel. A portion of the tape 120 hangs over the edge. The portion of tape 120 overhanging the edge of the diaper and oriented toward the diaper is brought into contact with the surface of tape 120 to close the diaper. The exposed surface of the tape 110 includes a modified surface, and the surface of tape 120 that is oriented toward the diaper includes a modified surface to unseal the diaper and to selectively reseal the diaper as desired. It will be appreciated that a portion 120a of the tape 120 may comprise a permanent adhesive to permanent attach a portion of the tape to the diaper surface. The underside of portion 120b comprises the modified adhesive surface to be releasably secured to the tape 110.

The following examples illustrate embodiments in accordance with aspects of the present teachings. Various pressure sensitive adhesives were modified with an additive material to provide a modified surface topography (also referred to as a detack layer or detack surface). The term PET and Mylar are used interchangeably in the examples and tables.

The tape as shown in FIG. 2a is made on a large adhesive coating and manufacturing machine and gets wound up into large master rolls. The pressure in the middle of such a roll can be as high as 100 to 120 psi depending on the size of the roll and winding tension used during roll winding. The filaments 232 sitting on the adhesive surface 230 after winding contact the back side of the liner 240. Because of the pressures in the roll, a part of the filaments 232 may get pushed into the PSA layer 230. The force and pressure vary from the outside to the center of the roll, the higher pressure being closer to the core. This varying pressure leads to varying amount of penetration of the detack layer into the PSA leading to varying height of the detack layer on the surface of the PSA depending on the position in the roll. The height of the detack layer depends on the spray conditions and can range from a few microns to several tens of microns and preferably being 20 to 50 microns. The detack layer controls the slidability, tack and bond strength and the variation in height due to the pressure pushing it into the PSA leads to variation in product performance i.e. bond strength and slidability.

In one embodiment, the tape comprises embossing a side of the liner 240 which contacts the detack layer on winding the roll. Here the liner 240 is chosen so that it is embossable. The liner could be a paper or a film coated on one or both sides with an embossable layer such as low density polyethylene (LDPE) or medium density polyethylene (MDPE) or polypropylene (PP) followed by siliconization on top of these embossable layers on both sides. The LDPE, MDPE or PP coating thickness could range from 20 microns up to about 100 microns. Embossable liners are generally available from companies like Mondi (such as P-Liner, which is a polycoated kraft paper both sides coated with PE and siliconized) or Loparex (such as Poly Silk, polycoated paper liner coated both sides with PE and siliconized). Under pressure and temperature, the LDPE, MDPE or the PP can be softened and various patterns can be embossed into the liner. The embossed recesses can range in depth from about 10 microns to about 90 microns and form the pockets, nests or recesses to prevent the filament 232 (FIG. 2b) from contacting the full face of the surface of 240 which would be contacted in an unembossed case. The only regions that contact the detack side are the spacers on the side of 240 which directly contact the filaments 232.

Figure 30:
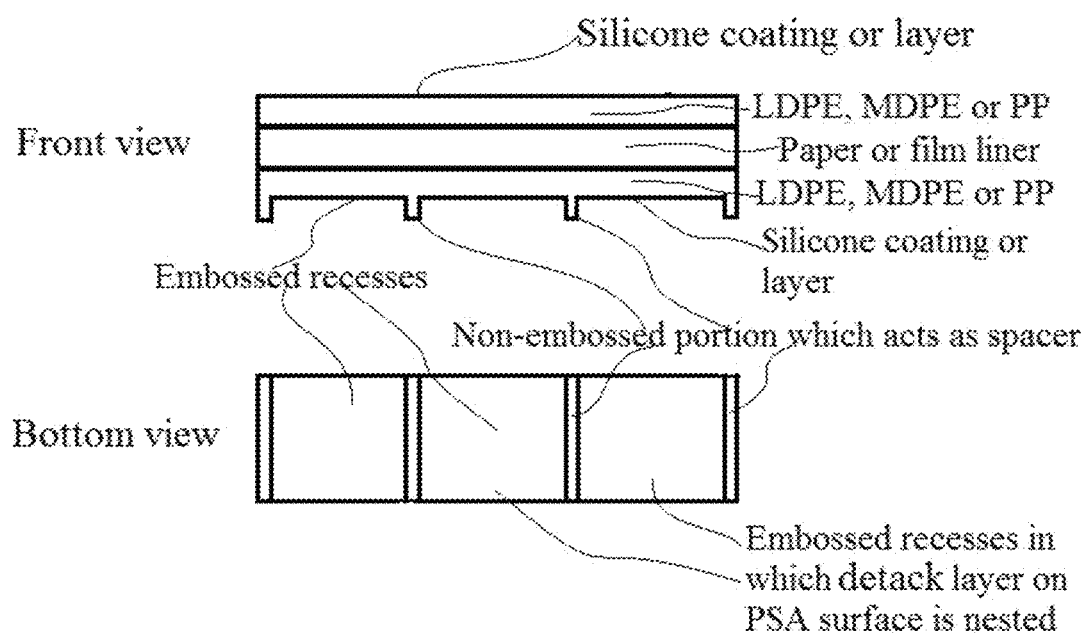
FIG. 30 is a perspective of the front view and the bottom view of the embossed liner showing the spacers and recesses.
Figure 31:
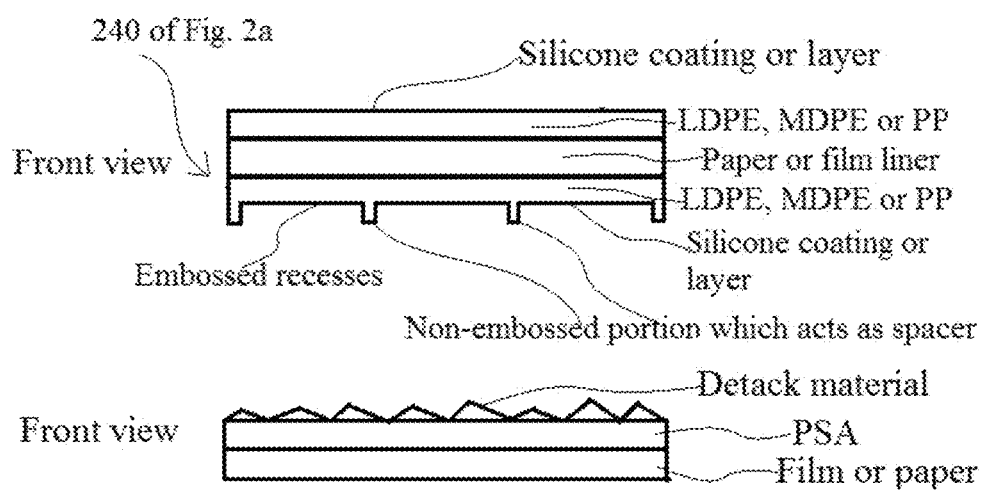
FIG. 31 is a perspective of how the PSA with the sprayed filaments come in contact with the backside of the liner 240 of FIG. 2a when embossed and when the roll is self-wound.
Figure 32:
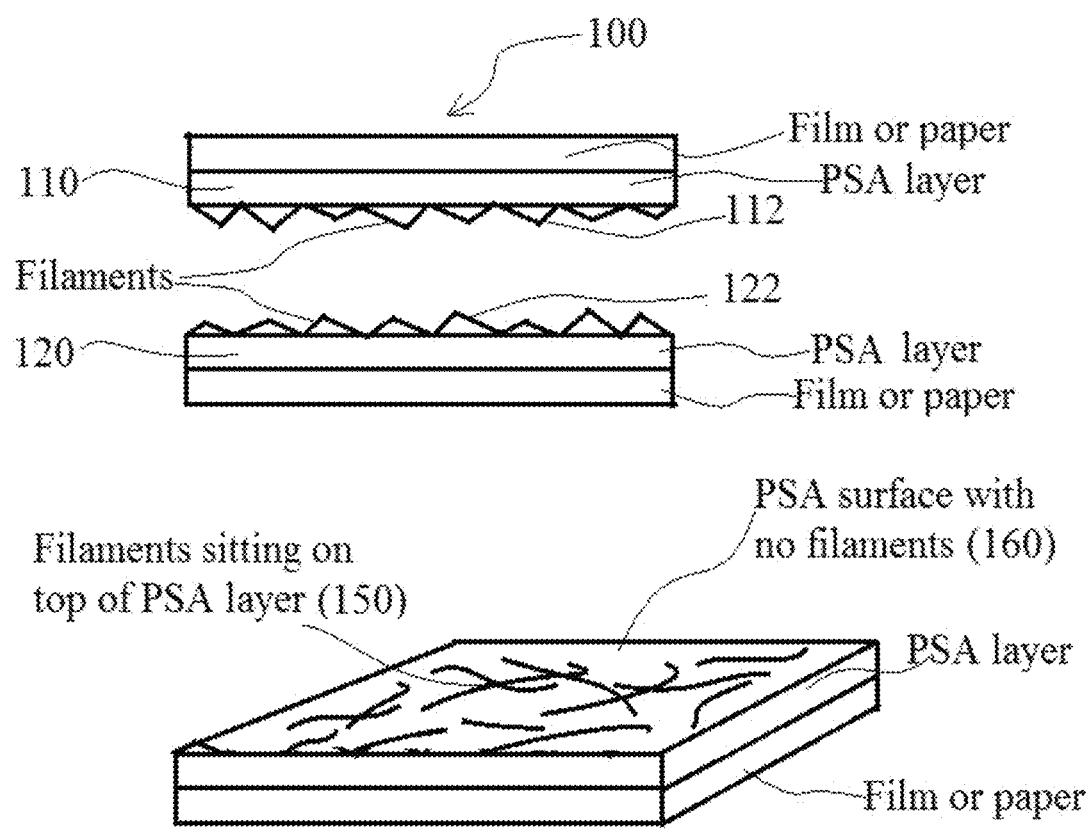
FIG. 32 is a three-dimensional expanded view of the schematic of the tape closure system of an embodiment of the invention shown in FIG. 3.

FIG. 30 (Front view) shows the embossed liner with the LDPE, MDPE or PP side embossed in a simple pattern to form recesses in the machine direction. The pattern depth (recess depth) can range from 10 to 90 microns, width being varied depending on the width of the tape needed for the application. This tape width could be 0.5", 0.75", or 1" or even wider. The width of each recess element between the spacers can also be varied. In one embodiment, the spacers make full contact with the filaments of 232 thereby pushing the filaments into the PSA. If the pushing and embedding of the filaments into the PSA is to be minimized across the wide web, the width of the raised spacer has to be small and vice versa. Any pattern that minimizes the exposure of the detack layer to the back side of the liner and hence minimizes the amount of detack layer that gets pushed into the PSA will provide a tape with surface that performs within acceptable limits.

The tape width used for most of these applications is 0.5, 0.75 or 1 inch and the pattern is so chosen that when the rolls are slit to make these narrow rolls, the amount of the detack embedded in the PSA is minimal. A simplistic pattern is shown in FIG. 30 (Bottom view), which is a bottom view of the embossed liner. Such a pattern can be created using a heated embossing roll that has the negative pattern of the pattern being embossed as the liner goes through a nip between the embossing roll and a backup roll. These master rolls are eventually slit to the width of the tape used for the application such as inside a bag for closure of the bag. The slitting of these rolls is done such that the slitting blade slits or cuts the roll in the center of the unembossed spacer. This way just the edges of the tape contact the release liner when wound, thus minimizing the penetration of the filaments (detack layer) into the PSA. Since the penetration of the filaments (detack layer) at the edges is just a tiny portion of the overall tape, it does not negatively affect the performance.

Another embodiment consists of coating the PSA in patterns (in stripes in the machine direction) leaving small gaps in between the stripes also in the machine direction, the gaps corresponding to the edges of the tapes that make contact with the spacers and not spraying the detack material in these uncoated PSA stripes. Thus, for example, when making a 1" wide PSA tape, the spacer could be designed to be 0.2" wide at either end, and the PSA coating done so that 1" wide PSA is coated with 0.2" gap on either side of the PSA stripe. This is registered with the detack sprayer so that no detack layer is sprayed in this region without PSA. This way, the portion of the web uncoated with PSA makes contact with the spacer. The slitting of the wide roll to make individual tape rolls is carried out in the middle of this 0.2" spacer, and after slitting, the very edges of the tape will have no adhesive. The rest of the tape with PSA sprayed with detack layer on top gets nested and isn't pushed into the PSA. Besides the geometry explained above i.e. strips in the liner along the machine direction, other embossed geometries in the liner such as hexagonal patterns etc. can be made to minimize the penetration of the detack layer into the PSA when it contacts the back of the liner. Such embossed geometries can be made to minimize the penetration of the filaments and manage the adhesion properties of the tape in large rolls subjected to varying pressures.

In one embodiment, a filmic liner is made by extruding a polyethylene (PE), a polypropylene (PP) or a polyester (PET) film in such a way that the raised portions are created during extrusion in the form of thin grooves either in the machine direction or different geometric patterns can be introduced in this film that serve as standoffs. This film can now be coated either in line during extrusion or after extrusion with a silicone coating to form a siliconized liner with a structure similar to the one contemplated by embossing a paper liner containing extrusion coated LDPE, MDPE or PP with a silicone coating on the top. Such a film would have raised portions acting as spacers and the recesses acting as nesting regions for the PSA containing sprayed detack layer when the two surfaces are brought together. Such a surface when contacted with the detackfied adhesive surface creates patterns on the detackified adhesive surface where the raised portions push in the detack layer into the adhesive. By manipulating such a liner surface and hence the detack layer getting pushed in to the adhesive, the adhesion values can be varied or dialed for different applications.

In another embodiment, spacers can be created by taking an extruded film or a paper and either printing or depositing or spraying entities on the surface which act as the spacers. The silicone coating is carried out on such a surface to create a siliconized liner with spacers and nesting regions.

Besides a self-wound structure, another embodiment comprises a structure of the laminate where there are two liners, one on the bottom PSA (PSA 210 and liner 240 of FIG. 2b) which is the PSA used to attach the tape to the bag and a top side liner which protects the detackfied PSA (liner on top of surface 232 of FIG. 2b). The bottom liner (liner 240) could be a liner without any geometric pattern on it while the top liner (on top of surface 232) could be the embossed liner or liner created by any one of the above described means.

In an embodiment of the present invention method, a functional material is continuously applied in the form of a tape to packaging materials on a packaging machine. Flexible material used for packaging includes without limitation films (e.g., PE, PP, PET, polyamide, and Polyvinyl chloride), metallized films, multi-layer films with barrier layers and other functional layers such as oxygen scavenging layers, paper (with or without coatings) and multilayer laminates (foil, paper, plastics). In another embodiment of the invention method, a detackified pressure sensitive adhesive based tape is applied in the transverse direction on a packaging machine.

An embodiment of the invention method is described herein for a Vertical Form Fill Seal machine (VFFS) as an example. The invention method is also applicable to other machines designed to form flexible materials into a package. The embodiment of the invention method considers application of tapes to packaging materials for which the tapes have a typical multi-layer construction (as shown in FIG. 2b) of a liner (240), a PSA (210) (which will subsequently form a bond with the packaging material), a substrate (220) (typically a film) and a functional surface (232). The functional surface could be a mechanical closure system (such as, but not limited to, a plastic zipper, a Zip-lock system or velcro) or an adhesive closure system (such as, but not limited to, a cohesive system or a PSA based adhesive system) or any other functional system that can be supported by the disclosed construction. The tape is applied to the packaging material in a continuous manner in the same process as the one where the packaging material is subsequently converted into a package (such as, but not limited to, a bag or a pouch). After the package is formed the tape is arranged so that the functional surfaces of the tape can be bought into contact to form, for example, a closure of the package. This closure may be permanent (i.e. not allowing reclosure after breaking) or could form a reclosure allowing the package to be repeatedly open and closed.

A VFFS machine (FIG. 4) is a type of automated assembly-line product packaging system, commonly used in the packaging industry for food, and a variety of other products. The machine constructs bags out of a flat rolls of film or other suitable materials, while simultaneously filling the formed bags with product and subsequently heat sealing the filled bags. Both solids and liquids can be bagged using this packaging system. A typical use for such a system is the packaging of cereals. The VFFS, often operating at very high speeds (>70 bags/min), produces bags of cereal which have permanent heat seals along three dimensions (top, bottom and side). The method allows, for example, another sealing system to be introduced in the transverse direction (i.e. across the packaging material web) without affecting the performance of the machine. This additional sealing system, which could replace one of the heat seals or be an additional seal (allowing, for example, for reclosure after a permanent heat seal is broken), is introduced in the form of a tape (as described in FIG. 2*b*).

Figure 34:
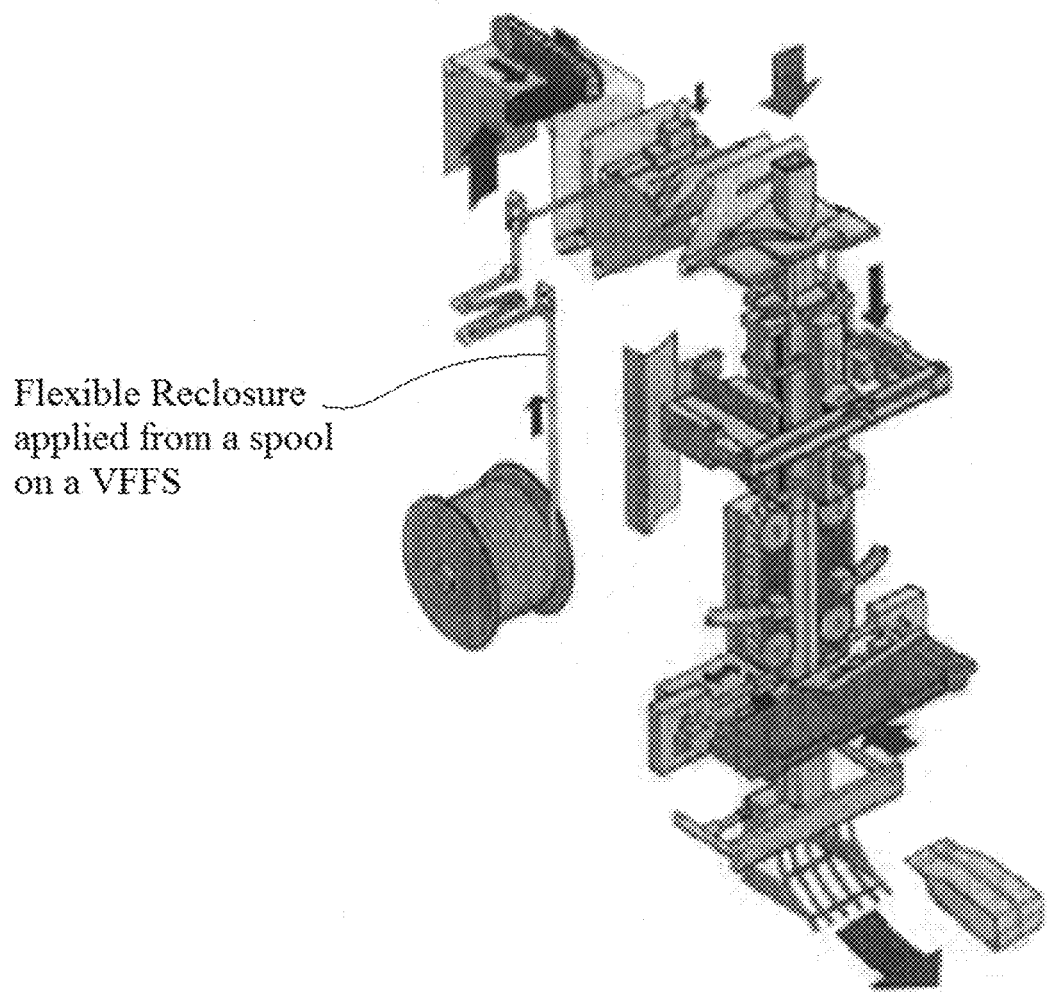
FIG. 34 shows a VFFS machine wherein a flexible reclosure is applied from a spool in the transverse direction to the web.

The current method of applying a functional system, such a closure or reclosure system, in a traverse direction, for example a plastic zipper, on a packaging machine involves applying the system from a spool on packaging machine as shown FIG. 34. This process has a number of deficiencies which include the following:

1. As the spool of tape is laid across the packaging material, the packaging material commonly stops moving as the spool is placed and then heat sealed to the packaging material. This means that the machine is often operating in an intermittent (not continuous) mode which means that the machine's output is considerably reduced (often by up to 20% or call for an elaborate spooling scheme which adds complexity to the packaging process if it is to be applied in a continuous process). A preferred method of FFS packaging machines today is a continuous high-speed mode.

2. Precise alignment of the spooled material on the packaging material is difficult leading to variations in pitch (between subsequent placements of spooled material) or registration, and this in turns leads to scrap.

The present invention method addresses the above shortcomings, allowing for the application of tape based functional systems across the packaging material web at high speeds and in continuous operation. Further, the system can be readily integrated (retrofitted) onto existing packaging machines. Registration of the closure system is achieved through a timing system described in the following four examples. These four examples use the tape shown in FIG. 2*b* wherein the functional part of the tape is a modified PSA with the detack layer (232). This modified tape in contact with itself forms a seal that can be readily opened and closed. In the examples that follow, a reclosure functionality is applied to a package. By changing the top surface of a tape embodiment, differing functionalities can be added (such as a mechanic closure system, a tamper-evident system, a cohesive closure system). Further in the four examples, use of an embodiment of invention method using a VFFS machine is described. Note that the invention could be used on any machine that forms a web or sheet of material into a package and is not limited to VFFS machines.

Example 1

Figure 35:
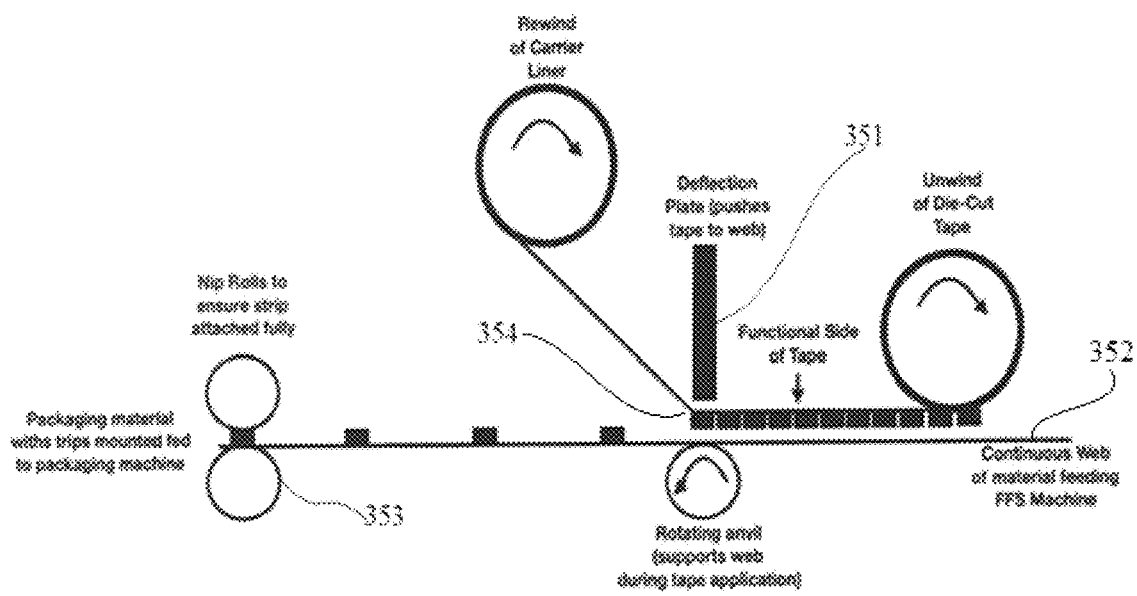
FIG. 35 shows how a die-cut self-wound roll of the reclosure tape is applied to the web of packaging material.

In the first example (see FIG. 35) the functional tape is provided in a self-wound roll form. The tape is previously die cut to provide strips of tape (see FIG. 36 for examples) that will subsequently be mounted onto the packaging material. The die cut functional tape is unwound and pulled through the process by the supporting liner which is rewound (along with any waste matrix) after the tape strips have been removed. The tape is indexed to a deflection plate (351) which deflects a tape strip bringing into contact with the packaging material which is moving just below the deflection area. During this process the liner takes a sharp inward turn (354) which further helps to peel the strip. The tape strip, with its adhesive side exposed, contacts the packaging material (352) to which it adheres and is therefore pulled off the liner effectively transferring the strip from the liner to the packaging material. The packaging material travels forward through driven nip rolls (353) which apply pressure ensuring that the tape strip is properly adhered to the packaging material. The packaging material, with the functional tape applied across it, now enters the packaging machine to be formed into a package. This process is repeated continuously with the pitch of applied tape being controlled by the frequency with which the deflection plate pushes indexed strips across the gap to the packaging web. It should be noted that this process relies on the functional surfaces of the tape having a reasonable affinity for the liner material carrying the tape. For example, this system works for functional material which includes cohesive and adhesives. However, for functional tapes in which functional surface would form a weak bond with the liner a modification is required which is discussed below in the following Example 2.

Example 2

Figure 37:
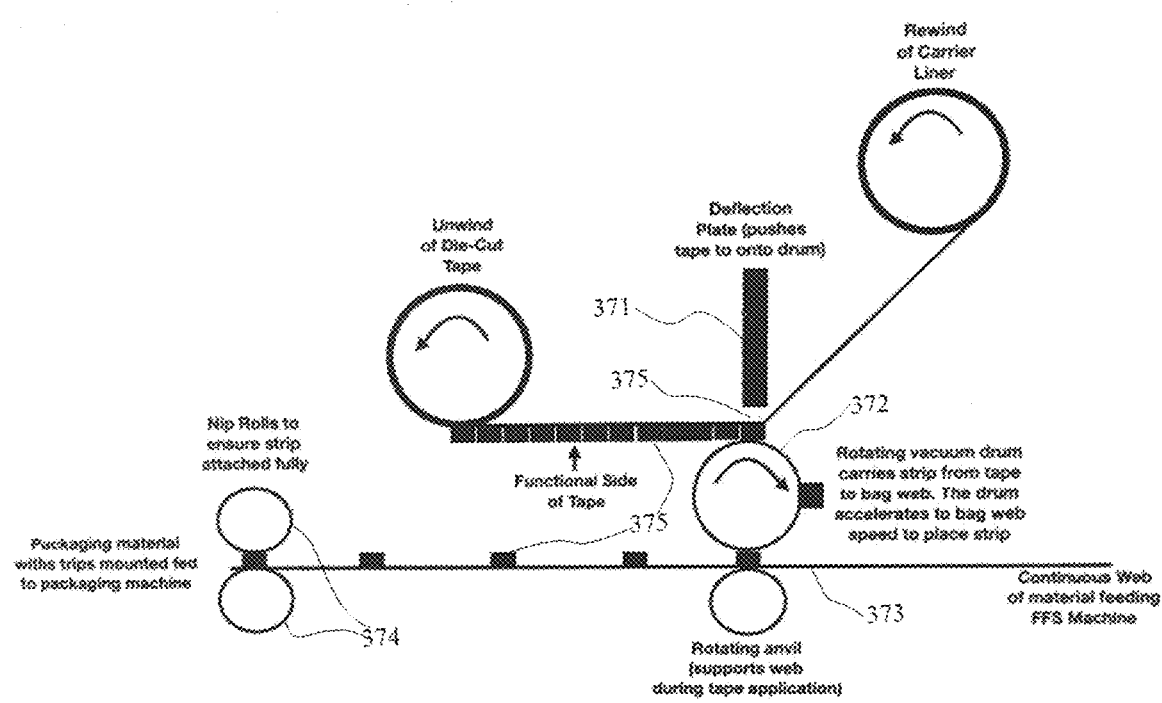
FIG. 37 shows the schematic of a die-cut roll of reclosure tape applied to the web of packaging material using a rotating vacuum drum.

In the second example (see FIG. 37) a system is considered in which the adhesive that will subsequently form the bond with the packaging material is in contact with the liner in the starting self-wound roll. In this system, the functional tape has already been die cut into strips (361) (as shown in FIG. 36). The tape is unwound and pulled through the process by the supporting liner (362) which is rewound after the strip is removed. The tape is indexed to a deflection plate (371) which pushes a tape strip bringing into contact with a vacuum drum (372) located below the deflection area. Again, the liner takes a sharp turn (375) during this process helping to peel the strip. The tape strip, with functional side exposed to the drum is peeled off the liner and carried forward by the rotating drum which accelerates to match the speed of the packaging material. The strip contacts the packaging material (373), with the non-functional high adhesion side facing outwards, which pulls the strip off the drum. The packaging material then travels forward through driven nip rolls (374) which applies pressure ensuring that the tape strip is properly adhered to the packaging material. The packaging material, with the functional tape now applied across it now enters the packaging machinery to be formed into a package. In this operation good results are obtained by stopping the drum briefly at the moment at which a strip is picked up and at the moment at which the strip is applied to the packaging material. It is readily seen that in this process the tape strip is effectively flipped so that functional side (such as velcro, a zipper, a modified adhesive closure etc) which was not in contact with starting liner is now face-up on the packaging material. This process is repeated continuously with pitch of applied tape being controlled by the frequency with which the deflection plate pushes indexed strips to the vacuum drum.

In the above two examples, the method relies on the tape strip being pre-die cut (i.e in strips on the self-wound tape which is fed to the described process). Subsequent to the above two examples, in FIG. 38 and FIG. 39, two complementary processes (to the two described above) are illustrated which require no pre-die cutting.

Example 3

Figure 38:
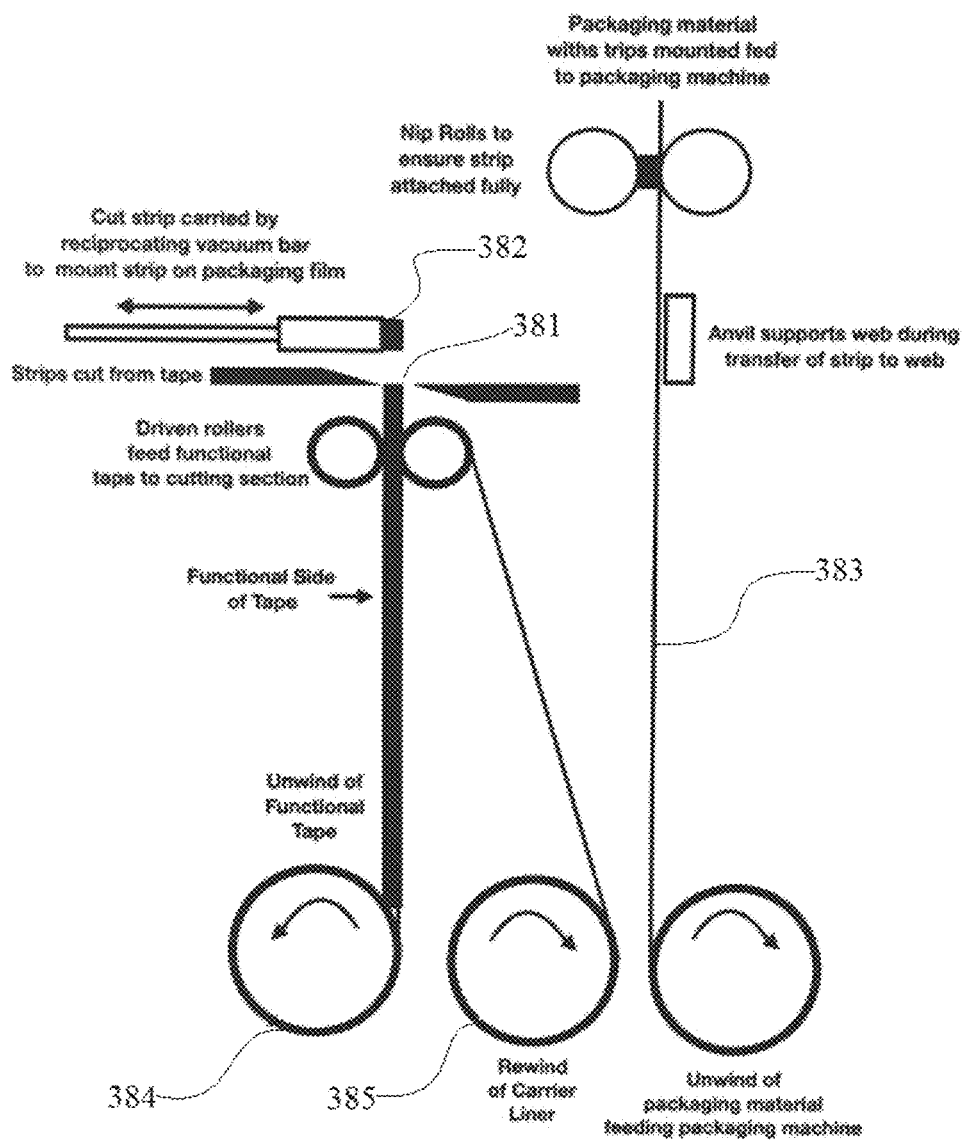
FIG. 38 shows the schematic of a non die-cut tape which gets cut and applied to the packaging material web using a reciprocating vacuum bar.

In FIG. 38 the functional tape (not pre-die cut) is unwound (384) with the liner stripped and fed to a rewind Stand (385). The tape, without the liner, feeds into a cutting station (381) which cuts and mounts the strip of tape (382) onto the packaging film (383). In this operation the packaging film must stop moving during the cutting and mounting operation. To ensure that the package machine can continue to operate continuously, a spooling system could be placed down-stream of the mounting area so that the stopping and starting of the packaging film web would not affect the continuous operation of the machine. (Note that if the packaging machine operated discontinuously then no spooling would be required).

Example 4

Figure 39:
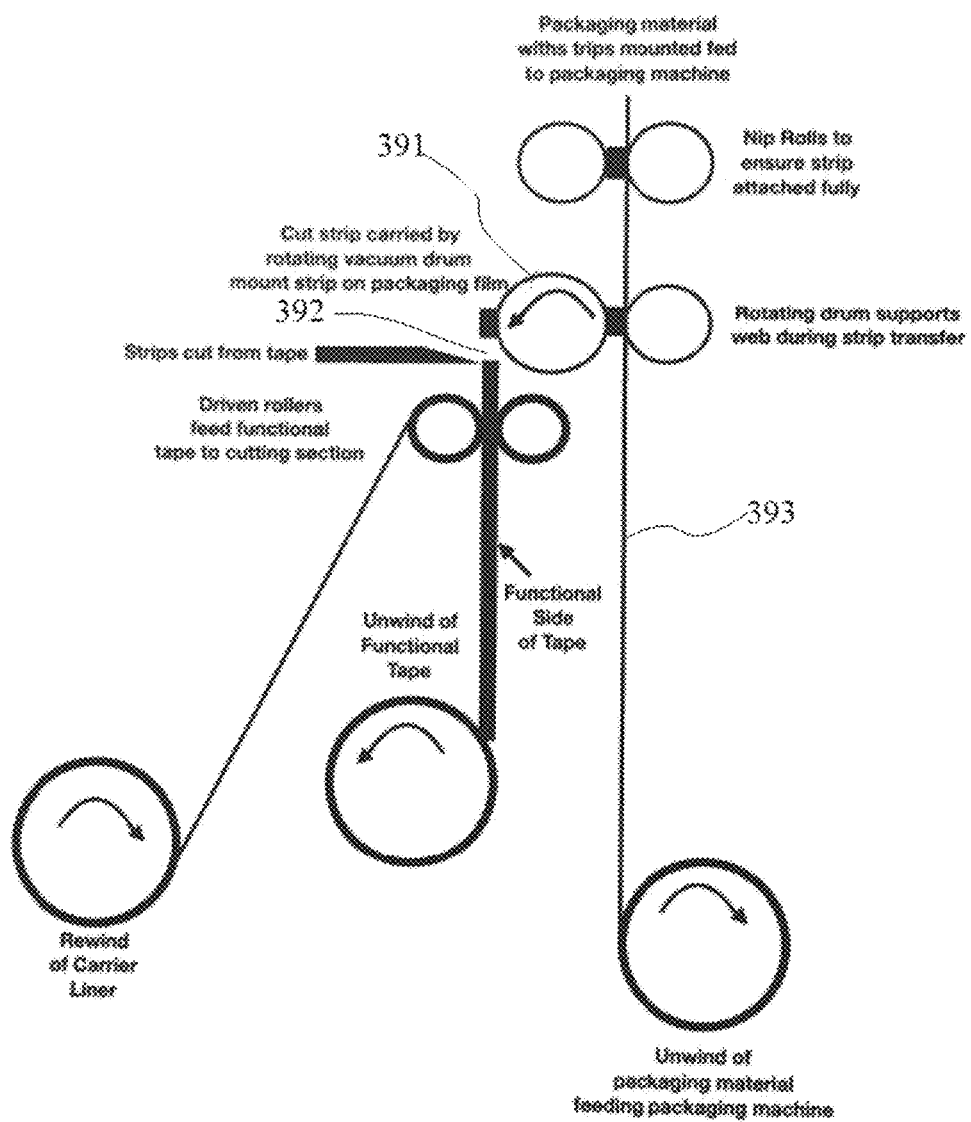
FIG. 39 shows the schematic of a non die-cut tape which gets cut in line and is picked up by a vacuum drum and applied to the web of the packaging material.

FIG. 39 is an illustration of a system similar to that described above and illustrated in FIG. 37. A vacuum drum (391) is used to transfer cut strips, with liner removed, to the continuously moving packaging web. However, in this system the strip is cut at the point of transfer (392) to the drum. Here tape material, in non-die cut form, is fed to the drum where it is cut and then picked up by the drum to be transferred to the packaging web (393). The drum is briefly stationary during cutting and transfer to the drum, and then accelerates to match the packaging film speed and stops briefly again during transfer. (Note that in some embodiments, the brief stopping of drum and subsequent acceleration may not be necessary).

Figure 40:
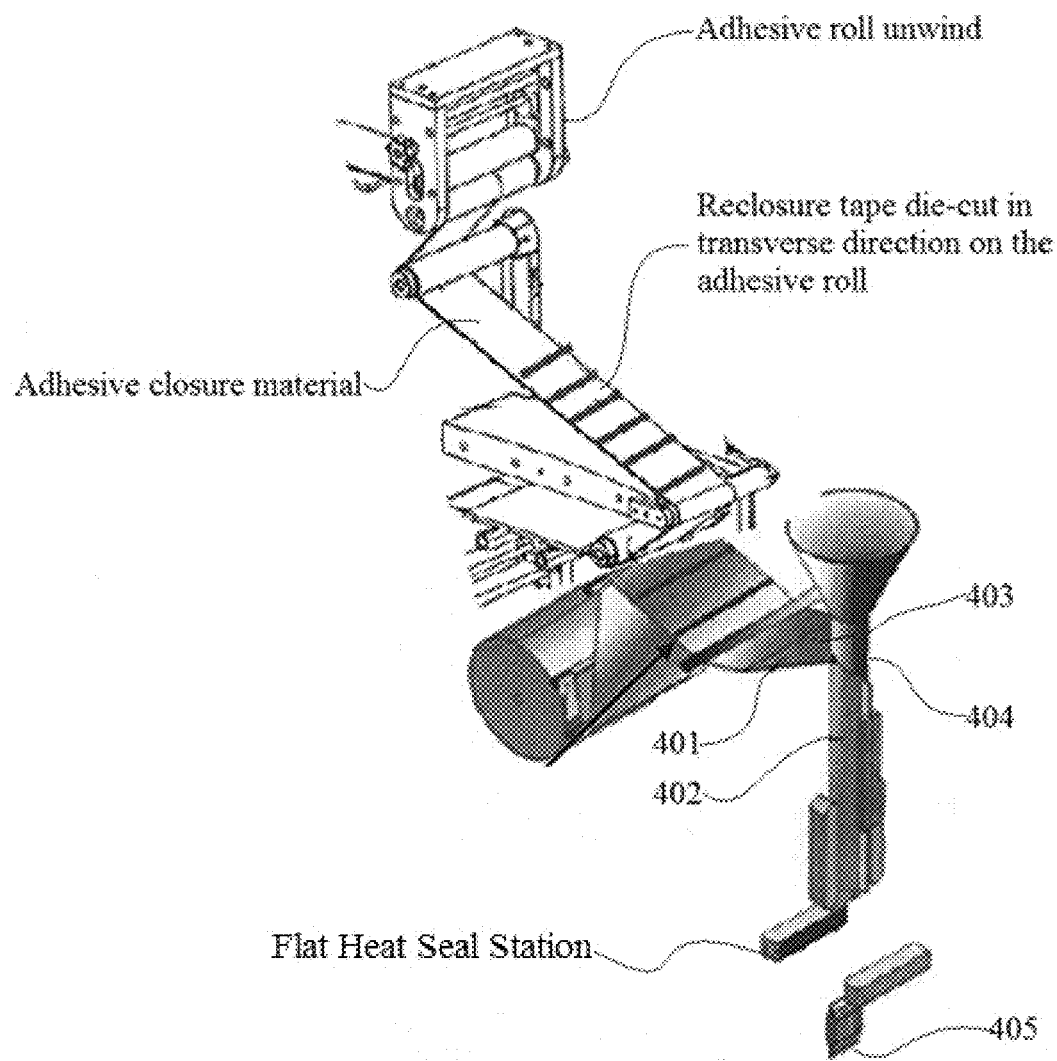
FIG. 40 is an illustration of a tape that is applied to a web of packaging material entering a VFFS machine.

An example of how the functional tape, now mounted, on the packaging machine travel through a VFFS machine is show in FIG. 40. In this case the packaging film (401) is formed into a tube (402) with the functional tape (403) running around an annulus of the tube (404). When the ends of the tube are collapsed the functional surface of the tape comes into contact with itself forming a seal, and/or a reclosable seal or some other functional form (such as a tamper evident seal).

The examples described herein include strip of tape with material having the same length as the width of the packaging material or where the width of tape material is less than the full width of the packaging material. The invention provides a continuous method of introducing a tape-based functionality into and across (transverse direction) a packaging material as part of the process which converts the packaging material into a package (405).

Another embodiment of invention is one where the self-wound pressure sensitive adhesive roll is die cut using a rotary die cut at the packaging machine to form the die-cut closure tapes in the transverse direction on the packaging machine which is in turn dispensed on to the flexible packaging material either in a process described above or, by a secondary process where the tape is peeled (picked from) the release liner using a vacuum rotary drum and applied in register to the flexible packaging material.

In an embodiment of the invention, functional closure structures are applied to packaging materials which allow the packaging materials to be subsequently formed into packages without meaningfully affecting the performance of machines or requiring any significant retrofits to said machines. In another embodiment, printing or applying the closure system to the packaging material on a press is performed prior to the material being used on the packaging line. The packaging material is then supplied to the packaging machine in standard roll form where it is unwound and assembled into the package (as shown for example in FIG. 1). In yet another embodiment, the application of the reclosure (or closure) structure to packaging materials which will have a typical multi-layer construction (as shown in FIG. 2*b*) comprised of a PSA (which is in contact with the packaging material), a surface on the PSA which provides some desired functionality and (optionally) a release system are done such that the PSA and the functional layer are printed (or otherwise deposited) on the inside of the packaging film which will subsequently contact the food or other ingredient.

A release system may be required to prevent the PSA/functional layer-sticking to the underside of the packaging material when the material is subsequently rolled up to go to the packaging machine. This optional release is printed/coated/sprayed on the outside side of the film (which may have the product information printed on this layer) and is registered to the PSA which is printed/coated/sprayed on the inside of the film, which becomes the inside of the bag. Thus, when the film is rolled up the PSA/functional layer will be contact with the release layer which will print it sticking the other of the film. The PSA will typically be printed on the packaging material in places where a closure system will be required (after the material is subsequently formed into a package). The PSA can be a rubber elastomer based PSA or an acrylic PSA or any material that can be easily deposited at high speeds on a press using for example (but not limited to) a rotogravure/printing process, or a die or a spray process. The PSA can be further cured on press if desired using for example radiation or heat. The functional surface will typically be a detack layer which may be printed, sprayed or otherwise deposited onto the PSA or be a part of the PSA blended therein. The detack material can be a non-tacky elastomer, or a filler mixed with an elastomer, and in general any material which has a slightly higher modulus (greater than $10^6$ dynes/cm$^2$) than the modulus of the PSA rendering it non tacky to the touch on finger pressure and which can be printed, sprayed or otherwise deposited on the surface of the PSA. The release system (required where the layers have residual tackiness) is then printed or otherwise deposited on the top (i.e. other side) layer of the film which may have the product information printed in cases where this package becomes the primary package such as in case of potato chip bags or no print in cases where this bag has no print matter such as in cases of cereal bag which goes in a box which has the printed information. This structure is applied to the packaging material on a standard press, or other suitable asset, to produce of a roll of packaging material with structures deposited throughout. Each of the three elements are added in tandem on the same process at three (or more) separate stations on the press. This roll of packaging material will subsequently be fed into a packaging machine and converted into a package (such as, but not limited to, a bag or a pouch).

An example of this shown in FIG. 4 where the prepared film is fed into VFFS. After the package is formed the functional structure is arranged so that the surfaces of the structure can be bought into contact to form a closure of the package. This closure may be permanent (i.e. not allowing reclosure after breaking) or could form a reclosure allowing the package to be repeatedly open and closed.

An example of the apparatus and method of an embodiment of the present invention is described here. In this example the packaging material will be formed into a cereal bag which is about 8" wide and about 10" long on a VFFS machine. An embodiment of the invention allows to add a reclosure feature to the top of the bag without any modification to the VFFS machine. The packaging material is first prepared with our structure on the press. A UV curable PSA is printed in a thin line (about 0.5") across (about 16" wide) the packaging material (transverse direction) every 10" down the web of material. The PSA is applied at a standard station and is cured at it moves to the next station. At this station, after the PSA has been cured, a detack layer is applied. The detack layer can be sprayed on top of the PSA. The film then moves forward to a third station where an optional release layer is printed on the reverse of the film in register with the PSA/detack system. The film is then wound up and is ready to feed directly into the VFFS packaging machine and be formed into package with the reclosure feature included. Note that in one embodiment, the packaging materials are printed prior to being formed into a package and the addition of the reclosure system of the present invention is done during the process described in the example.

Another embodiment of the invention is a tape which has a permanent, removable or an ultra-removable adhesive on the opposite of the detackified surface. Yet another embodiment of the invention is a surface modified tape where the surface modification is on both sides of the tape. Such laminates are provided either in sheet form or tape form and are useful for a wide range of applications where temporary fastening is needed for in-house or office or industrial applications. In another embodiment, an adhesive or adhesive tape is applied in the slitting process at the packaging material supplier.

Figure 41:
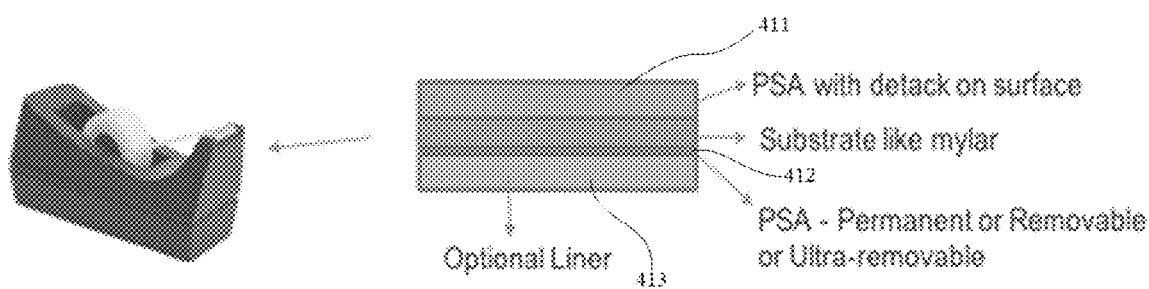
FIG. 41 illustrates a self-wound roll of detackified PSA on a tape dispenser with a permanent or removable adhesive on the opposite side with an optional liner.

FIG. 41 illustrates a pressure sensitive adhesive on a carrier substrate and whose surface has been modified with a detack material (411) and is on a tape dispenser (as shown) or is in sheet form. The other side (412) of the carrier substrate has either a permanent or a removable or ultra-removable pressure-sensitive adhesive. Side 412 is optionally protected by a single sided liner (413) when in sheet form and a double-sided liner while in self-wound tape form. The side 412 can be attached to any object leaving side 411 free to attach to a side 411 of another object (which has this laminate) to form a closure. One can envision these applications being very wide ranging in nature such as for closing file folder envelopes, storage bags, gift wraps, hospital gowns, attachment surface to attach things onto surfaces like refrigerator, walls etc. These applications can span consumer, medical, industrial, office and other market segments where two surfaces need to be temporarily attached and detached. Presently these applications are served by buttons, clasps, Velcro etc. which are more cumbersome and expensive.

Figure 42:
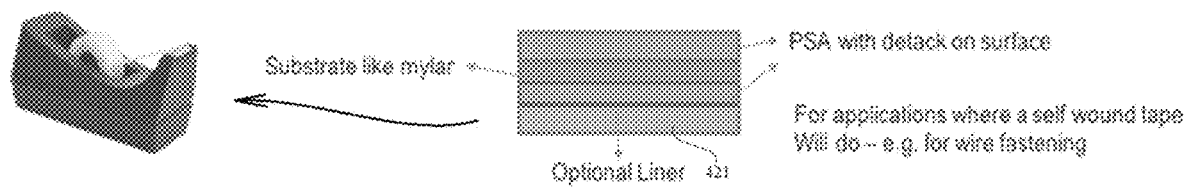
FIG. 42 illustrates a self-wound roll of a detackified PSA on both sides of a substrate with an optional liner on one side.

Another embodiment of the present invention is shown in FIG. 42 which is an illustration of a laminate having a detack layer on both sides and is in the form of a self-wound roll. The laminate can optionally have a double-sided liner (421). Such a sheet or tape can be used for wrapping on itself to hold an object in place for applications such as wire wrapping, for holding catheters on arms or legs where presently other types of materials such as Velcro are used.

An embodiment of the present invention can also be used for temporary closure with no damage done to the underlying system. For example, for wrapping gifts using the system shown in FIG. 42. Not only is the closure temporary (allowing easy opening) but the tape can be removed from the paper and the paper can be used again. This would be valuable for scrapbooking and photo albums. These structures can be supplied either as die cut sheets of various lengths and widths to enable easy removal and usage or as a tape which can be dispensed on a tape dispenser.

T Peel Measurements

The laminates were made by attaching the PSA layer 210 (such as S 246 from Avery Dennison at 18 gsm coat weight) from FIG. 2 to the cereal bag or other bag material. The T peel values of the various tape modifications were tested by bringing together the modified PSA surfaces 232, laminating them, dwelling them for various times and then testing the T peel using a Labthink XLB(B) Auto Tensile tester (Labthink Instruments Co. Ltd.) using a separation speed to 300 mm/min. Typically, a half-inch width of the tape of the pressure sensitive adhesive with the detack layer (or in some cases just the pressure sensitive adhesive) was attached to the other half of the tape, placed on a hard surface, and rolled back and forth once with a 2 kg rubber roller. The dwell time after lamination is typically 30 minutes unless otherwise specified in the examples. The ends were delaminated and attached to the clamps of a LabThink XLB(B) Auto Tensile tester and separated at a speed of 300 mm/min. An average of 3 to 5 specimens was tested, and the average T Peel data is reported in N/inch (N/in).

In examples where food stuff such as cereal, chips, or other contents of a bag were used to test the adhesion of the adhesive after pouring the food stuff across the adhesive surface, the following method was used:

The tape with the adhesive surface was attached to the side of a cardboard jig having a 45 degree angle. The food stuff was poured across the tape, and the method described in the previous paragraph was employed to evaluate T Peel. T Peel was measured after 1, 5, and 10 closures.

Friction Test

A one inch sample of the laminate was laid down on a stationary stainless steel panel with the detack layer touching the stainless steel panel. A 200 gram weight was placed on top of the tape, and the end of the tape was attached to a Fish Scale AdiyZ portable electronic scale. The digital scale was pulled at a constant speed of 3.85 feet/min. with the tape moving across the stainless steel panel with the 200 gram weight on top of the tape. The frictional force of the detack/pressure sensitive adhesive layer moving across the stainless steel panel with the 200 gram weight on the tape is recorded in pounds (lb). Swifitherm 84659 and Advantra PHC 9200 yielded values of 0.18 and 0.3 lb. respectively.

Detack Surface Coverage Measurement

A digital photo of the detackified pressure sensitive adhesive surface was taken using an Ablegrid 2 Megapixel USB digital microscope. The image was analyzed using an ImageJ analyzer, which is an NIH free-ware. The surface coverage was recorded as a percentage of the total area covered by the detack layer.

Detack Coat Weight Measurement

The coat weight of the detack layer on the pressure sensitive adhesive was measured gravimetrically by first measuring the weight of a 2 inch by 2 inch area of the pressure sensitive adhesive with the film and subtracting it from the total weight of the detack layer/pressure sensitive adhesive/film.

Width of the Filament

A digital photo of the detackified pressure sensitive adhesive was taken using an Ablegrid 2 Megapixel USB digital microscope. The particle size and distribution of the spray coated samples was determined using ImageJ software. The filament width (with hot melt sprayed detack layer) was measured directly from the image and averaged.

Example 1

A hot melt adhesive HL 8005 X from HB Fuller was printed using nylon mesh screens (Component Supply Company) with the following Food Grade inks from Colorcon: FGN 5427 Black No Tox Direct contact printing ink, FGN 5474 Blue No Tox Direct contact printing ink, and FGN 5424 Yellow No Tox Direct contact printing ink. The following nylon mesh screens were used: 52 microns (32% open area), 64 microns (47% open area), and 25 microns (15% open area). FIGS. 8-11 shows several screen-printed surfaces and the data on these surfaces is shown in Table 1.

TABLE 1

| Example | PSA coat wt gsm | Mesh size μm | Ink coat wt, gsm | Colorcon Ink Type | T Peel, 30 min N/in | T Peel, 24 hr N/in | T Peel, 7 days N/in |
|---|---|---|---|---|---|---|---|
| Control | 25 | | | | 2.3 | 3 | 3.3 |
| 1.1.1 | 25 | 25 | 10.9 | FGN 5427 | 2 | 2.3 | 2.9 |
| 1.1.2 | 25 | 25 | 15.8 | FGN 5427 | 1.1 | 1 | 1.5 |
| 1.1.3 | 25 | 52 | 6.2 | FGN 5427 | 1.3 | | 1.8 |
| 1.1.4 | 25 | 52 | 11 | FGN 5427 | 1.6 | 1.7 | 1.4 |
| 1.1.5 | 25 | 64 | 15.5 | FGN 5427 | 1.1 | 1.1 | 2.2 |
| 1.1.6 | 25 | 64 | 21.9 | FGN 5427 | 0.5 | 0.2 | 0.5 |
| 1.1.7 | 45 | 25 | 12.9 | FGN 5424 | 1.9 | 1.9 | 1.8 |
| 1.1.8 | 45 | 64 | 12.1 | FGN 5424 | 1.1 | 1.2 | 1.8 |
| 1.1.9 | 25 | 64 | 18.9 | FGN 5424 | 0.9 | 0.6 | 0.6 |
| 1.2 | 45 | 25 | 11 | FGN 5474 | 1.9 | 1.6 | 1.8 |
| 1.2.1 | 45 | 64 | 24.8 | FGN 5474 | 0.35 | 0.5 | 0.6 |
| 1.2.2 | 45 | 64 | 19 | FGN 5474 | 0.6 | 0.3 | 0.4 |
| 1.2.3 | 45 | 64 | 26 | FGN 5474 | 0.2 | 0.2 | 0.2 |

Example 2

The hot melt adhesive HL 8005X coated on 2 mil Mylar was sprayed with a hot melt elastomer, PHC 9200 from HB Fuller. The spraying was carried out with a Nordson Universal spray nozzle system using low flow continuous signature, intermittent signature, and control coat nozzles using the VB12 unit and using low flow gear pump pR6m1 (flow rate of 0.83 g/cc per rev). The T Peel data of modified adhesive to adhesive on Mylar is shown in Table 2. The surface coverage is the percentage of PSA surface covered by the additive. The finger slide rating in Table 2 is rated from 5 being non-tacky to touch to 1 being tacky to touch. Several of the sprayed surfaces are shown in FIGS. 12-22.

TABLE 2

| Example | PSA coat wt gsm | Nozzle Type | Pattern Air pressure (psi) | Pattern Air Temp ° F. | Line speed (fpm) | Gun height inch | Pump speed (rpm) | Surface coverage % | Finger slide Rating | T Peel 30 mm N/in |
|---|---|---|---|---|---|---|---|---|---|---|
| 2.1 | 15 | Low Flow Cont. Sig. | 8 | 275 | 200 | 3 | 3 | 16.3 | 4 | 0.15 |

TABLE 2-continued

| Example | PSA coat wt gsm | Nozzle Type | Pattern Air pressure (psi) | Pattern Air Temp ° F. | Line speed (fpm) | Gun height inch | Pump speed (rpm) | Surface coverage % | Finger slide Rating | T Peel 30 mm N/in |
|---|---|---|---|---|---|---|---|---|---|---|
| 2.1.1 | 15 | Low Flow Cont. Sig. | 8 | 275 | 150 | 3 | 3 | 20.2 | 4 | 0.4 |
| 2.1.2 | 30 | Low Flow Cont. Sig. | 8 | 275 | 175 | 3 | 3 | 15.4 | 4 | 0.7 |
| 2.1.3 | 30 | Low Flow Cont. Sig. | 8 | 275 | 150 | 3 | 3 | 21 | 4 | 0.4 |
| 2.1.4 | 45 | Low Flow Cont. Sig. | 8 | 275 | 200 | 3 | 3 | 19 | 4 | 0.8 |
| 2.1.5 | 45 | Low Flow Cont. Sig. | 8 | 275 | 175 | 3 | 3 | 22.1 | 4 | 0.26 |
| 2.1.6 | 45 | Low Flow Cont. Sig. | 8 | 275 | 150 | 3 | 3 | 29 | 3 | 0.14 |
| 2.2 | 15 | Intermittent Sig. | 20 | 275 | 150 | 2.5 | 3 | 12.1 | 3 | 0.4 |
| 2.2.1 | 15 | Intermittent Sig. | 8 | 275 | 175 | 3 | 3.25 | 19.2 | 4 | 0.25 |
| 2.2.2 | 30 | Intermittent Sig. | 8 | 275 | 150 | 3 | 3.25 | 21.5 | 4 | 0.36 |
| 2.2.3 | 30 | Intermittent Sig. | 8 | 275 | 100 | 3 | 3.25 | 24 | 5 | 0.3 |
| 2.2.4 | 30 | Intermittent Sig. | 8 | 275 | 125 | 3 | 3.25 | 26.1 | 5 | 0.12 |
| 2.2.5 | 45 | Intermittent Sig. | 8 | 275 | 200 | 3 | 3.25 | 25.2 | 4 | 0.2 |
| 2.2.6 | 45 | Intermittent Sig. | 8 | 275 | 180 | 3 | 3.25 | 29.1 | 4 | 0.3 |
| 2.2.7 | 45 | Intermittent Sig. | 8 | 275 | 150 | 3 | 3.25 | 32.8 | 5 | 0.2 |
| 2.3 | 30 | Control coat | 20 | 275 | 100 | 2.5 | 3 | 19.1 | | 0.4 |
| 2.3.1 | 30 | Control coat | 20 | 275 | 120 | 2.5 | 3 | 22.5 | | 0.3 |
| 2.3.2 | 30 | Control coat | 20 | 275 | 150 | 2.5 | 3 | 28.7 | | 0.6 |
| 2.3.3 | 45 | Control coat | 20 | 275 | 85 | 2.5 | 3 | 23.9 | | 1 |
| 2.3.4 | 45 | Control coat | 20 | 275 | 60 | 2.5 | 3 | 27 | | 0.8 |
| 2.3.5 | 45 | Control coat | 20 | 275 | 45 | 2.5 | 3 | 30.8 | | 0.6 |

Example 3

A hot melt PSA HL 8005X from HB Fuller was coated on a paper liner (from Chemsultants) at 40 gsm coat weight and laminated to 2 mil Mylar from Chemsultants. The liner was removed and CaCO$_3$ (Hubercal 150FG) from Huber Engineered Materials was sprinkled evenly onto the surface at various coat weights. This PSA surface was non-tacky to the touch and a finger could easily slide over it. Strips of this surface modified PSA brought together and pressed with fingers formed a good seal and could be repeatedly opened and closed. The coat weight of CaCO$_3$ was 12.1 gsm, average particle diameter on surface was 42 μm and 30 min T Peel was 3.75 N/inch.

Example 4

The hot melt adhesive HL 8005X coated on 2 mil Mylar was sprayed using an air brush with the following Food Grade ink from Colorcon: FGN 5427 Black No Tox Direct contact printing ink. Half inch strips of the sprayed PSA surfaces were brought together and rolled with a 2 kilogram (kg) roller, allowed to dwell for 30 minutes, 24 hours, and 8 days, and the T Peel value was measured. Data is shown in Table 4.

TABLE 4

| Example | PSA type | PSA coat wt gsm | Ink coat wt gsm | Colorcon Ink Type | Ink coverage % | Av particle diameter (μm) | T Peel 30 mm N/in | T peel, 24 hr N/in | T peel, 8 days N/in |
|---|---|---|---|---|---|---|---|---|---|
| 4.1 | HL 8005X | 25 | 7.3 | FGN 5427 | 10.60 | 36 | 3 | 4.2 | 4 |
| 4.2 | HL 8005X | 25 | 10 | FGN 5427 | 12.4 | 38 | 2.4 | 4 | 4.6 |
| 4.3 | HL 8005X | 25 | 11.6 | FGN 5427 | 16.4 | 40 | 2.2 | 2 | |

TABLE 4-continued

| Example | PSA type | PSA coat wt gsm | Ink coat wt gsm | Colorcon Ink Type | Ink coverage % | Av particle diameter (μm) | T Peel, 30 mm N/in | T peel, 24 hr N/in | T peel, 8 days N/in |
|---|---|---|---|---|---|---|---|---|---|
| 4.4 | HL 8005X | 25 | 12.4 | FGN 5427 | 32.5 | 56 | 1.6 | | 2.4 |

Example 5

Three hot melt PSAs from Avery Dennison, FA20, R128, Z3000 coated on 1 mil PET facestock were sprayed with Colorcon FGN 5427 Black ink at various coverages. The other side of PET was laminated to a transfer tape of Avery Dennison Hammerlock adhesive coated at around 30 gsm. The free side of the Hammerlock adhesive was laminated to 2 mil high density polyethylene (HDPE) film. Half inch strips of the sprayed PSA surfaces were brought together and rolled with a 2 kg roller, allowed to dwell for 1 hour and tested in a T Peel configuration using the Labthink XLB(B) tester at 300 mm/min. Data is shown in Table 5. Several of the sprayed surfaces are shown in FIGS. 23-27. As shown in FIGS. 23-37, the standoffs may be provided in a random arrangement of non-regular shapes (e.g., non-regular dots, filaments or ellipsoids) wherein a fraction of the particles may overlap.

TABLE 5

| Example | PSA type | PSA coat wt, gsm | Ink coat wt, gsm | Colorcon Ink Type | Ink coverage % | Av particle diameter (μm) | T Peel, 1 hr, N/in |
|---|---|---|---|---|---|---|---|
| 5.1 | AD FA20 | 30 | 0 | | | | 3 |
| 5.1.1 | AD FA20 | 30 | 7.7 | FGN 5427 | 12.2 | | 3.3 |
| 5.1.2 | AD FA20 | 30 | 9.3 | FGN 5427 | 19.4 | | 3.3 |
| 5.1.3 | AD FA20 | 30 | 10 | FGN 5427 | 21.3 | | 2.7 |
| 5.2 | ADR-128 | 30 | 0 | | | | 6.7 |
| 5.2.1 | ADR-128 | 30 | 7.8 | FGN 5427 | 14.6 | 39 | 4.2 |
| 5.2.2 | ADR-128 | 30 | 9 | FGN 5427 | 19.3 | | 3.8 |
| 5.2.3 | ADR-128 | 30 | 9.8 | FGN 5427 | 24.6 | | 2.6 |
| 5.3 | ADZ-3000 | 30 | 0 | | | | 10.5 |
| 5.3.1 | ADZ-3000 | 30 | 7.6 | FGN 5427 | 11.2 | | 6.2 |
| 5.3.2 | ADZ-3000 | 30 | 8.9 | FGN 5427 | 17.6 | | 6.2 |
| 5.3.3 | ADZ-3000 | 30 | 9.9 | FGN 5427 | 24.3 | | 3.6 |

Example 6

The hot melt adhesives of the examples coated on 1 mil Mylar at 30 gsm coat weight were sprayed with detack layer on a Nordson VB 12 table top unit. The nozzle type was Continuous Signature Low flow, the pattern air temperature was 275° F., the line speed was 275 feet per minute, the gun height was 2.5 inches, and the pump type was PR6MI with a feed rate of 0.93 g/revolution. The PSA types used were ADZ3000 (A), AD FA 20 (B), AD R128 (C), and Fuller8005 (D). The detack materials used were Fuller PHC 9200 (E) and PHL 4157 (F). This laminate was used for T Peel testing. T Peel was measured after 1, 5, and 10 laminations. The results are shown in Table 6.

TABLE 6

| Example | PSA type | PSA coat wt. gsm | Pattern Air pressure (psi) | Pump Speed (rpm) | Detack Material | Detack coat weight gsm | Detack surface coverage % | T peel after reclosures, N/inch 1 | 5 | 10 | Friction test, lb | Width of the detack filament, μ |
|---|---|---|---|---|---|---|---|---|---|---|---|---|
| Control | 1 mil Mylar, No PSA | 0 | | | None | 0 | 0 | | | | 0.11 | |
| 6.1 | A | 30 | 10 | 15 | E | 4.1 | 37.1 | 7.2 | 9 | 8.5 | 0.35 | 30-120 |
| 6.2 | A | 30 | 10 | 20 | E | 5.2 | 41.3 | 4.9 | 4 | 4 | 0.42 | 25-95 |
| 6.3 | A | 30 | 12 | 15 | E | 5.7 | 50.7 | 4.1 | 4.7 | 5.7 | 0.56 | 20-120 |
| 6.4 | A | 30 | 12 | 10 | E | 2.5 | 46 | 5.8 | 7 | 8.3 | | |
| 6.5 | A | 30 | 10 | 25 | E | 7 | 44.4 | 2.3 | 3.1 | 3.3 | 0.36 | |
| 6.6 | A | 30 | 14 | 10 | E | 2.9 | 52.7 | 8 | 7.4 | 8.2 | 0.78 | |
| 6.7 | A | 30 | 14 | 6 | E | | 43.9 | 5.8 | 7.5 | 8.5 | 1.11 | 15-50 |
| 6.8 | B | 30 | 10 | 15 | E | 4.2 | 25.4 | 4.9 | 4.2 | 5.7 | 1.8 | 20-50 |
| 6.9 | C | 30 | 10 | 15 | E | 3.8 | 28.5 | 3.1 | 5.4 | 4.6 | 1.6 | |
| 6.10 | D | 44 | 10 | 15 | E | | 38.7 | 1.2 | 0.8 | 0.7 | 1.76 (transfer)* | |
| 6.11 | A | 30 | 10 | 15 | F | 4.3 | 25.5 | 3.9 | 4.3 | 8 | | |
| 6.12 | B | 30 | 10 | 20 | F | 5.9 | 19.8 | 5.3 | 6.3 | 7.5 | 2.15 | |
| 6.13 | C | 30 | 10 | 25 | F | 6.4 | 27.7 | 3.2 | 4.8 | 6.1 | 1.78 | |
| 6.14 | D | 44 | 10 | 15 | F | 5.4 | 29.2 | 0.4 | 0 | 0 | 2.2 (transfer)* | |

*Some of the detack layer transferred to the SS panel

Example 7

T Peel data after a different number of reclosures was evaluated with and without cereal poured across the tape. Cheerios® were employed as the cereal and in each case, 1 cup of cereal was poured across each time. Table 7 shows results of these tests.

TABLE 7

| Ex. | Sample | T Peel after reclosures, N/inch 1 | 5 | 10 | Detack coat weight, gsm | PSA coat wt, gsm | Detack Surface Coverage¾ | Finger slide rating before and after reclosures | Friction test, lb |
|---|---|---|---|---|---|---|---|---|---|
| Control | 1 mil Mylar film (Chemsultants) | | | | | | | | 0.11 |
| 7.1 | Avery Z3000 | 11 | 9.2 | 8.73 | | 30 | | 1 | Too high, CNM* |
| 7.2 | Avery Z3000 + Cheerios ® | 5 | 2.53 | 0.82 | | 30 | | | |
| 7.3 | Fuller Swiftmelt 82674 | 32 | 38 | 26 | | 30 | | 1 | Too high, CNM* |
| 7.4 | Fuller Swiftmelt 82674 + Cheerios ® | 20 | 6.67 | 2.3 | | 30 | | | |
| 7.5 | Fuller HL2811 PW | 18.83 | 17.7 | 16.1 | | 30 | | 1 | Too high, CNM* |
| 7.6 | Fuller HL2811 PW + Cheerios ® | 8.67 | 4.1 | 1.73 | | 30 | | | |
| 7.7 | Avery Z3000 | 11 | 9.2 | 8.73 | | 30 | | 1 | Too high, CNM* |
| 7.8 | Avery Z3000 + 9200 detack (Ex 6.1) | 7.2 | 9 | 8.5 | 4.1 | 30 | 37.1 | 5 | 0.35 |
| 7.9 | Avery Z3000 + Cheerios ® | 5 | 2.53 | 0.82 | | 30 | | | |
| 7.10 | Avery Z3000 + 9200 Detack (Ex 6.1) + Cheerios ® | 4.6 | 1.71 | 0.4 | 4.1 | 30 | | 5 | |

TABLE 7-continued

| Ex. | Sample | T Peel after reclosures, N/inch | | | Detack coat weight, gsm | PSA coat wt, gsm | Detack Surface Coverage¾ | Finger slide rating before and after reclosures | Friction test, lb |
|---|---|---|---|---|---|---|---|---|---|
| | | 1 | 5 | 10 | | | | | |
| 7.11 | Avery Z3000 + 9200 Detack (Ex6.6) + Cheerios ® | 6.2 | 3.93 | 0.85 | 2.94 | 30 | 52.7 | 5 | |
| 7.12 | Avery Z3000 + 9200 detack(Ex 6.7) + Cheerios ® | 4.4 | 2.5 | 0.68 | 4.1 | 30 | 43.9 | 5 | |
| 7.13 | Avery FA 20 | 4.13 | 4.3 | 4.63 | | 30 | | | Too high, CNM* |
| 7.14 | Avery FA20 + Cheerios ® | 3.9 | 2.13 | 0.53 | | 30 | | | |
| 7.15 | Avery R128 | 3.6 | 2.8 | 2.4 | | 30 | | 1 | Too high, CNM* |
| 7.16 | Avery R128 + 9200 detack (Ex 6.9) | 3.1 | 5.4 | 4.6 | 3.8 | 30 | 28.5 | 5 | 1.6 |
| 7.17 | Avery R128 + 9200 detack(Ex 6.9) + Cheerios ® | 2.4 | 1.37 | 0.86 | | 30 | | | |
| 7.18 | Fuller 8005 | 1.2 | 0.8 | 0.7 | | 44 | | 1 | Too high, CNM* |
| 7.19 | Fuller 8005 + 9200 detack(Ex 6.10) + Cheerios ® | 0.24 | 0 | 0 | | 44 | | | |

*CNM = could not measure - PSA was sticking to the SS panel too strongly and it was not possible to pull it along In the case of the tape without the detack layer, the surface is very sticky and the cereal sticks to the tape. The cereal remained stuck to the tape and had to be shaken off with the detack layer, the surface is slidable to the finger, and the cereal slid right off the surface without sticking as illustrated by the high finger slide rating and low friction test. The surface of the 1 mil Mylar film against the stainless steel had a friction of 0.11 lb. Example 1 with Z3000 PSA with Fuller PHC 9200 as the detack layer gave a friction of 0.35 lb. The Z3000 adhesive without the detack layer had a friction that was too high to measure.

The T Peel values drop with the number of reclosures due to contamination of the adhesive surface. The openings between detack filaments or the features on the surface for getting the finger slidability are chosen so that they are smaller than the cereal being poured across the tape surface. Some fine food particles that are present in the bag, however, may fall between the filaments or other features used for detackifying the surface, leading to a reduction in T Peel. The adhesive choice, amount of detack layer, the pattern, the overall stiffness of the laminate, etc., are used to regulate the peel such that even after multiple pours across the tape surface, the tape still retains adequate adhesion to tightly seal the bag contents. A T Peel after 10 such reclosures on the order of 0.4 N/in or higher is generally sufficient to tightly seal a package.

Example 8

Table 8 shows data from tests evaluating a metallized Mylar bag of potato chips (Lays®). Example 6.1 of Table 6 was used as the pressure sensitive adhesive/detack layer on 1 mil Mylar. The PSA/detack layer was attached to the metallized bag using the S 246 transfer tape.

TABLE 8

| Example | T Peel after reclosures, N/inch | | | Detack coat weight, gsm | PSA coat wt, gsm | Detack Surface Coverage, % | Friction test, lb |
|---|---|---|---|---|---|---|---|
| | 1 | 5 | 10 | | | | |
| 8.1 | 1.9 | 1.7 | 0.6 | 4.1 | 30 | 37.1 | 0.35 |

Example 9

Two half inch by half inch strips of the tape of Example 6.1 were put together in such a way that the overlap area was 0.5 inches by 0.5 inches. This laminate was placed on a hard surface and the overlapped area was rolled up and down with a 2 kg rubber roller. After a 30-minute dwell time, the ends of the tape were placed in the jaws of the Labthink tester and separated at a speed of 300 mm/min. The dynamic shear value was measured to be 26 N/0.25 square inches.

What has been described above includes examples of the present specification. It is, of course, not possible to describe every conceivable combination of components or methodologies for purposes of describing the present specification, but one of ordinary skill in the art may recognize that many further combinations and permutations of the present specification are possible. Accordingly, the present specification is intended to embrace all such alterations, modifications and variations that fall within the spirit and scope of the appended claims. Furthermore, to the extent that the term "includes" is used in either the detailed description or the claims, such term is intended to be inclusive in a manner similar to the term "comprising" as "comprising" is interpreted when employed as a transitional word in a claim.

The foregoing description identifies various, non-limiting embodiments of a tape closure system. Modifications may occur to those skilled in the art and to those who may make and use the invention. The disclosed embodiments are merely for illustrative purposes and not intended to limit the scope of the invention or the subject matter set forth in the claims.

The invention claimed is:

1. A method of applying a functional tape to a packaging material on a packaging machine, said functional tape being provided in a self-wound roll form and die cut to provide strips of the functional tape for mounting on the packaging material, comprising:
   applying the strips of the functional tape to the packaging material either in transverse direction or in the machine direction; and
   wherein the functional tape comprises a first pressure sensitive adhesive layer having an upper adhesive surface and a plurality of standoffs of non-adhesive materials, the standoffs disposed in a random distribution on top of the upper adhesive surface, with at least two of the plurality of standoffs partially overlapping with one another, the plurality of standoffs comprising sprayed materials applied onto the upper adhesive surface to provide randomized distribution of the standoffs on the upper adhesive surface.

2. The method of claim 1, wherein the functional tape is either pre die cut to provide strips of the functional tape for mounting on the packaging material, or the strips of the functional tape are cut in line prior to applying to the packaging material.

3. The method of claim 1, further comprising unwinding by pulling the functional tape through a packaging process using a supporting liner that is rewound after the strips of tape are removed.

4. The method of claim 1, further comprising indexing the functional tape to a deflection plate that deflects the strip of the functional tape, thereby bringing it into contact with the packaging material that is moving below the deflection area.

5. The method of claim 1, further comprising exposing the adhesive side of the strip of the functional tape, contacting and adhering the adhesive side of the strip of the functional tape with the packaging material.

6. The method of claim 5, further comprising pulling off a supporting liner and transferring the strip of the function tape to the packaging material.

7. The method of claim 6, further comprising applying pressure to the strip of the functional tape by passing the packaging material through nip rolls, thereby ensuring that the strip is adhered to the packaging material and forming a package from the packaging material in the packaging machine.

8. The method of claim 3, further comprising the supporting liner taking an inward turn thereby helping to peel the strip of the functional tape.

9. The method of claim 4, wherein the packaging process is repeated continuously with a pitch of the functional tape being controlled by a frequency with which the deflection plate pushes an indexed strip of the functional tape across a gap to a packaging web.

10. The method of claim 1, further comprising indexing the functional tape to a rotating vacuum drum that carries the strip of the functional tape and brings it into contact with the packaging material that is moving proximate to the rotating vacuum drum.

11. The method of claim 1, wherein the standoffs cover from about 5% to about 60% of the surface area of the adhesive surface.

12. The method of claim 1, wherein the functional tape has a T Peel value of from about 0.2 N/inch to about 20 N/inch.

13. A method of forming a reclosure fastening system on a packaging material during printing of graphics on the packaging material, comprising:
   printing a pressure-sensitive adhesive using a printing press in a transverse direction on a first side of the packaging material;
   spraying or printing a detack material on a top surface of the pressure-sensitive adhesive;
   printing a release coating on a second side of the packaging material registered with the pressure-sensitive adhesive whereby the release coating acts to release the detackified pressure-sensitive adhesive layer without blocking; and
   wherein the upper detackfied surface of the pressure-sensitive adhesive has a plurality of non-adhesive standoffs disposed in a random distribution on top of the upper adhesive surface, with at least two of the plurality of standoffs partially overlapping with one another, the plurality of standoffs comprising sprayed materials applied onto the upper adhesive surface to provide randomized distribution of the standoffs on the upper adhesive surface.

14. The method of claim 13, wherein the standoffs cover from about 5% to about 60% of the surface area of the adhesive surface.

15. The method of claim 13, wherein the reclosure fastening system has a T Peel value of from about 0.2 N/inch to about 20 N/inch.

16. The method of claim 1, wherein the standoffs comprise filaments and/or ellipsoids of non-adhesive materials, the filaments being of different lengths and/or thicknesses, the ellipsoids being of different diameters and/or thicknesses.

17. The method of claim 13, wherein the standoffs comprise filaments and/or ellipsoids of non-adhesive materials, the filaments being of different lengths and/or thicknesses, the ellipsoids being of different diameters and/or thicknesses.

* * * * *